(12) United States Patent
Shimba et al.

(10) Patent No.: US 7,822,489 B2
(45) Date of Patent: Oct. 26, 2010

(54) ELECTRONIC DEVICE CONTROL APPARATUS, METHOD FOR CONTROLLING ELECTRONIC DEVICE, ELECTRONIC DEVICE CONTROL PROGRAM, AND COMPUTER-READABLE RECORDING MEDIUM HAVING RECORDED ELECTRONIC DEVICE CONTROL PROGRAM

(75) Inventors: Noriko Shimba, Nara (JP); Sachio Nagamitsu, Kyoto (JP)

(73) Assignee: Panasonic Corporation, Osaka (JP)

( * ) Notice: Subject to any disclaimer, the term of this patent is extended or adjusted under 35 U.S.C. 154(b) by 579 days.

(21) Appl. No.: 11/885,564

(22) PCT Filed: Feb. 21, 2006

(86) PCT No.: PCT/JP2006/303030

§ 371 (c)(1),
(2), (4) Date: Sep. 4, 2007

(87) PCT Pub. No.: WO2006/092983

PCT Pub. Date: Sep. 8, 2006

(65) Prior Publication Data

US 2008/0275573 A1    Nov. 6, 2008

(30) Foreign Application Priority Data

Mar. 4, 2005    (JP) ............................. 2005-060115

(51) Int. Cl.
*G05B 19/18* (2006.01)
*G05B 11/01* (2006.01)
*G06F 15/16* (2006.01)

(52) U.S. Cl. .............................. 700/19; 700/2; 700/20; 709/47; 709/209; 709/233

(58) Field of Classification Search ................... 700/19, 700/2, 20; 709/204, 205, 233
See application file for complete search history.

(56) References Cited

U.S. PATENT DOCUMENTS 7,016,888 B2 *    3/2006    Slemmer et al. ............... 706/47
7,081,830 B2 *    7/2006    Shimba et al. ......... 340/825.62
2003/0231602 A1 *   12/2003    Slemmer et al. ............ 370/282

(Continued)

FOREIGN PATENT DOCUMENTS

JP    2916020    4/1999

(Continued)

*Primary Examiner*—Ramesh B Patel
*Assistant Examiner*—Sivalingam Sivanesan
(74) *Attorney, Agent, or Firm*—Wenderoth, Lind & Ponack, L.L.P.

(57) ABSTRACT

A device communication portion receives operational status data, and an operational status accumulation portion accumulates the operational status data. A link information management portion manages operational status link information containing trigger device information to specify the operational status of a single home appliance among plural home appliances and linked device information to specify another home appliance that activates in association with the operational status of the single home appliance. An operational status read portion extracts operational status data corresponding to the operational status in the trigger device information and extracts operational status data corresponding to the linked device information. An associated control information setting portion generates associated control information containing the operational status of the single home appliance and used as the condition to start the associated control of a single electronic device and another electronic device and the content of control on the another home appliance.

16 Claims, 28 Drawing Sheets

U.S. PATENT DOCUMENTS

2005/0257006 A1 * 11/2005 Yoshida et al. .............. 711/118

FOREIGN PATENT DOCUMENTS

| JP | 2000-333275 | * | 11/2000 |
| JP | 2002-95072 | * | 3/2002 |
| JP | 2003-274033 | | 9/2003 |
| WO | 2004/010232 | * | 1/2004 |

* cited by examiner

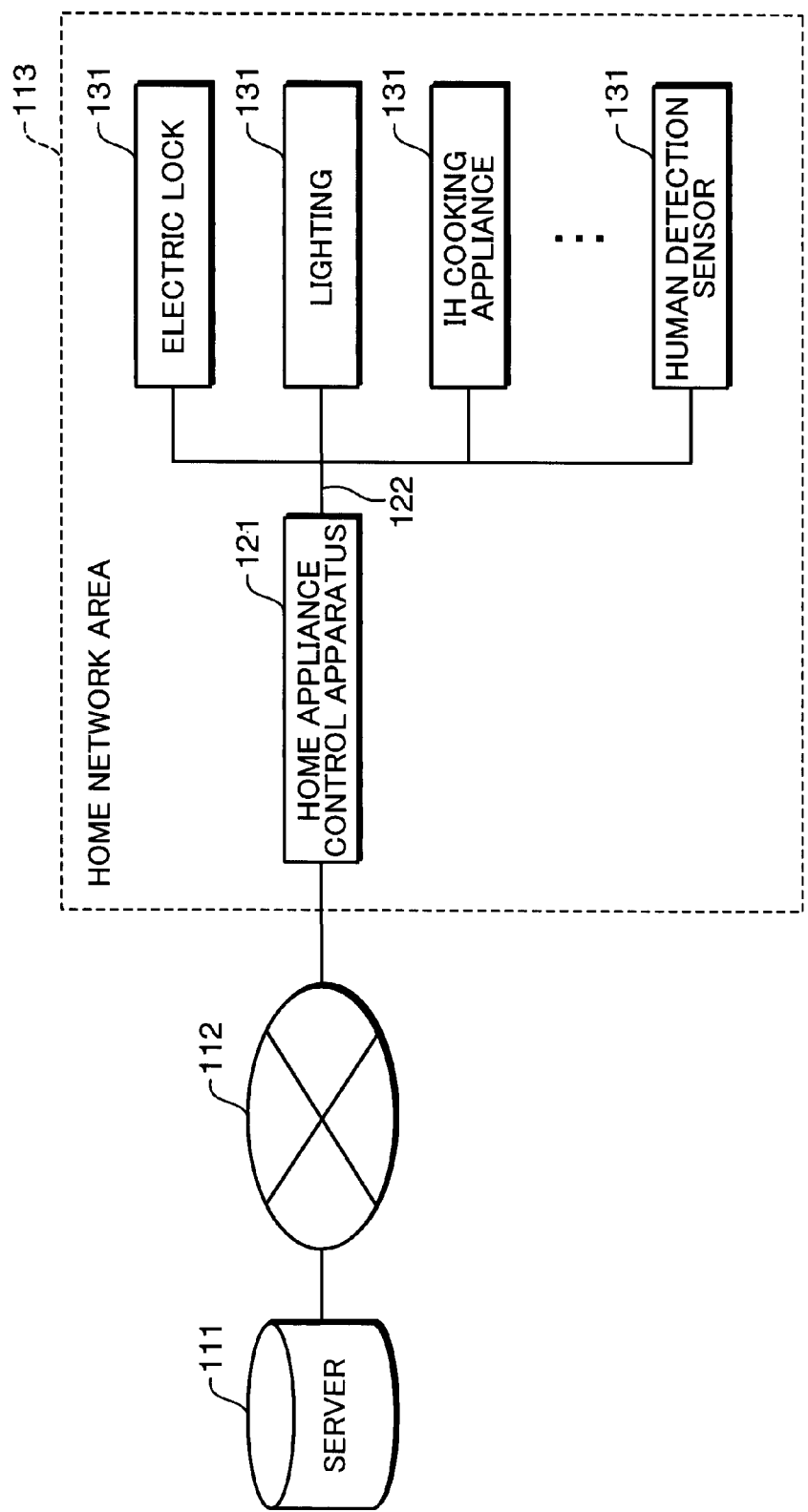

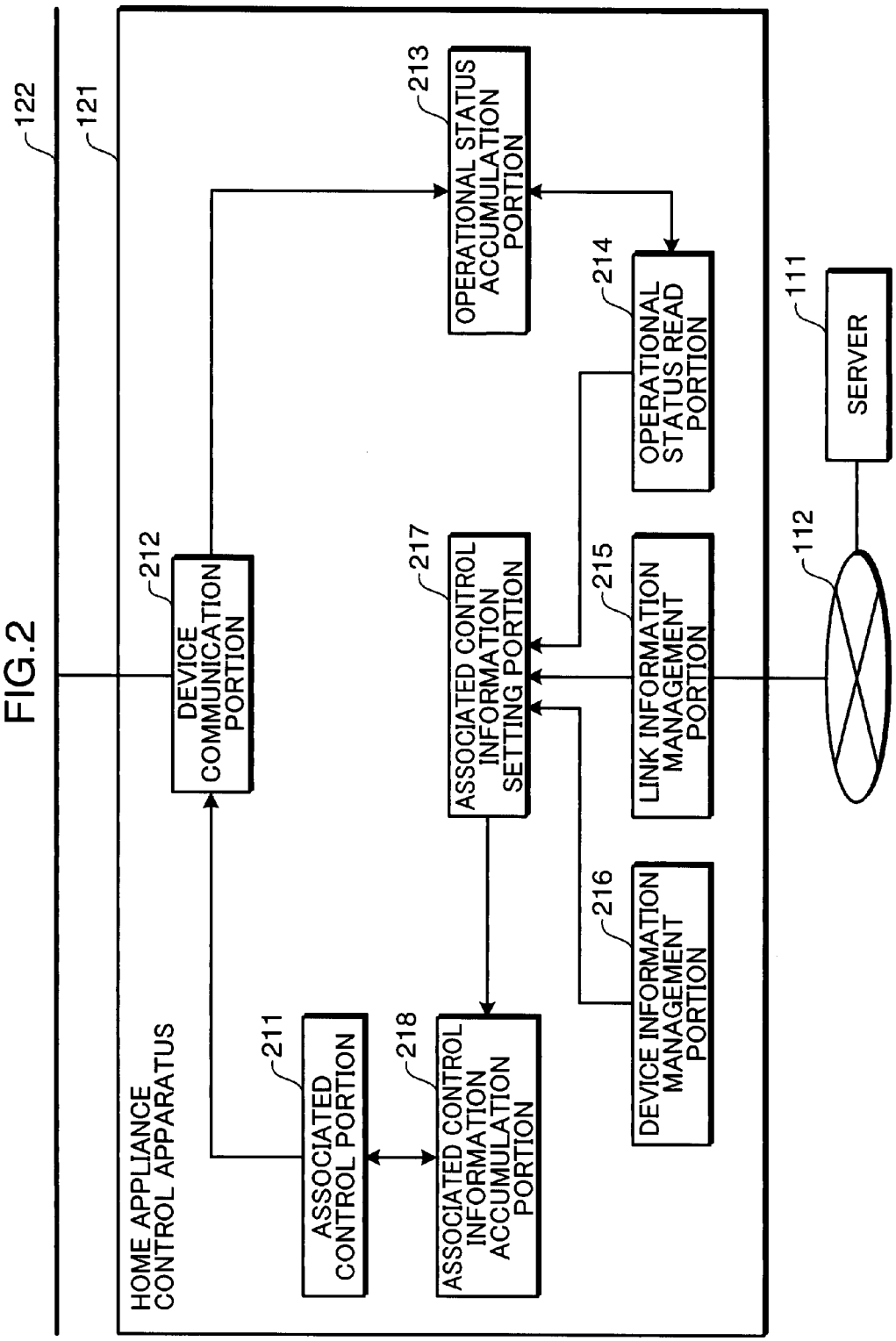

FIG.3

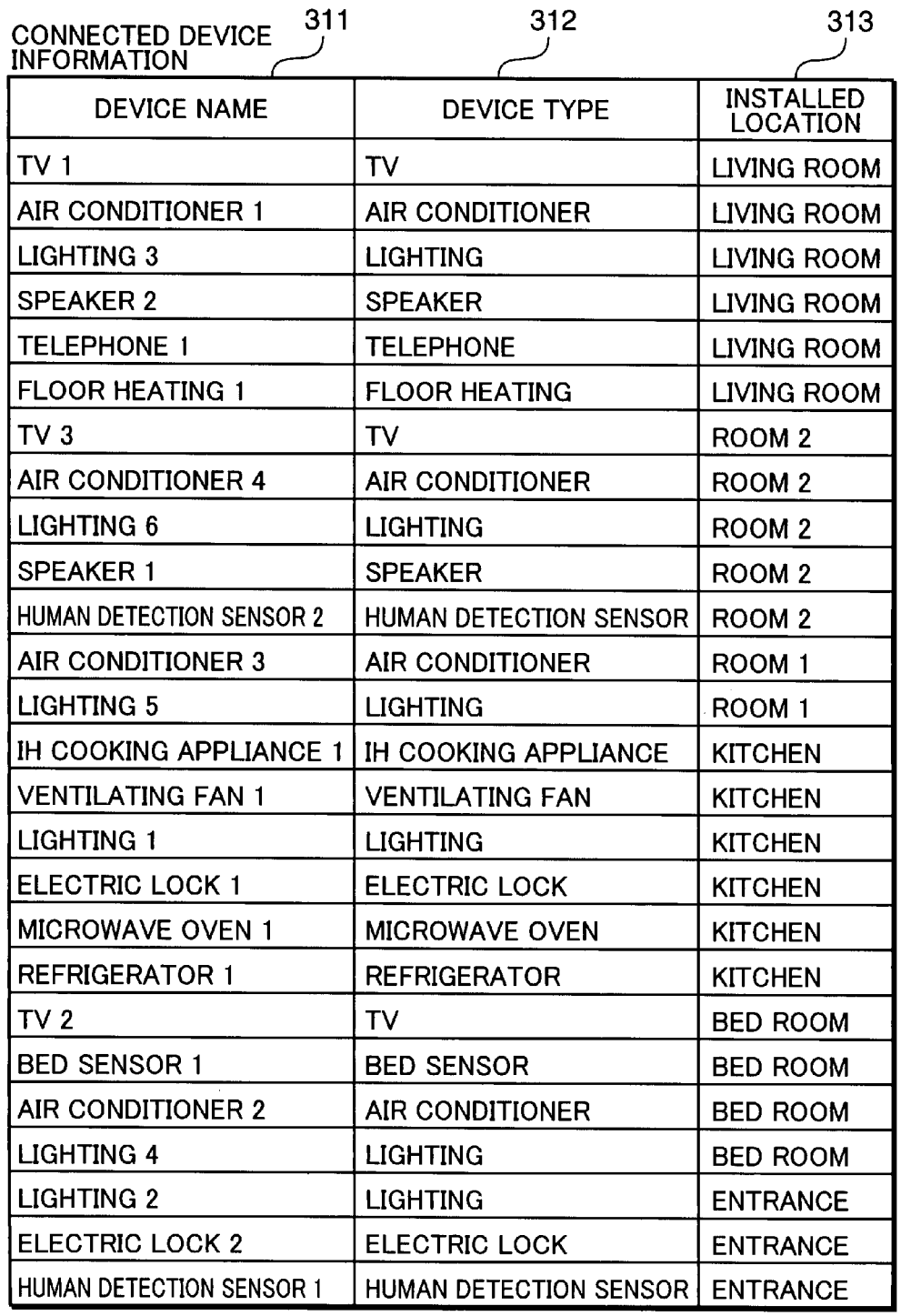

CONNECTED DEVICE INFORMATION

| DEVICE NAME | DEVICE TYPE | INSTALLED LOCATION |
|---|---|---|
| TV 1 | TV | LIVING ROOM |
| AIR CONDITIONER 1 | AIR CONDITIONER | LIVING ROOM |
| LIGHTING 3 | LIGHTING | LIVING ROOM |
| SPEAKER 2 | SPEAKER | LIVING ROOM |
| TELEPHONE 1 | TELEPHONE | LIVING ROOM |
| FLOOR HEATING 1 | FLOOR HEATING | LIVING ROOM |
| TV 3 | TV | ROOM 2 |
| AIR CONDITIONER 4 | AIR CONDITIONER | ROOM 2 |
| LIGHTING 6 | LIGHTING | ROOM 2 |
| SPEAKER 1 | SPEAKER | ROOM 2 |
| HUMAN DETECTION SENSOR 2 | HUMAN DETECTION SENSOR | ROOM 2 |
| AIR CONDITIONER 3 | AIR CONDITIONER | ROOM 1 |
| LIGHTING 5 | LIGHTING | ROOM 1 |
| IH COOKING APPLIANCE 1 | IH COOKING APPLIANCE | KITCHEN |
| VENTILATING FAN 1 | VENTILATING FAN | KITCHEN |
| LIGHTING 1 | LIGHTING | KITCHEN |
| ELECTRIC LOCK 1 | ELECTRIC LOCK | KITCHEN |
| MICROWAVE OVEN 1 | MICROWAVE OVEN | KITCHEN |
| REFRIGERATOR 1 | REFRIGERATOR | KITCHEN |
| TV 2 | TV | BED ROOM |
| BED SENSOR 1 | BED SENSOR | BED ROOM |
| AIR CONDITIONER 2 | AIR CONDITIONER | BED ROOM |
| LIGHTING 4 | LIGHTING | BED ROOM |
| LIGHTING 2 | LIGHTING | ENTRANCE |
| ELECTRIC LOCK 2 | ELECTRIC LOCK | ENTRANCE |
| HUMAN DETECTION SENSOR 1 | HUMAN DETECTION SENSOR | ENTRANCE |

FIG.4

OPERATIONAL STATUS LINK INFORMATION

| TRIGGER DEVICE | | | | LINKED DEVICE | | | LINK INTERVAL |
|---|---|---|---|---|---|---|---|
| DEVICE TYPE | PROPERTY | PROPERTY VALUE | INSTALLED LOCATION | DEVICE TYPE | INSTALLED LOCATION | | |
| IH COOKING APPLIANCE | OPERATIONAL STATUS | ON | KITCHEN | VENTILATING FAN | KITCHEN | | FROM 1 MIN BEFORE TO 5 MIN LATER (411) |
| TELEPHONE | HOOK STATUS | OFF | <ALL> | SPEAKER | <SAME ROOM> | | FROM 20 SEC BEFORE TO 20 SEC LATER (412) |

FIG.5

OPERATIONAL STATUS DATA

| DATE | DEVICE NAME | INSTALLED LOCATION | PROPERTY 1 | PROPERTY VALUE 1 | PROPERTY 2 | PROPERTY VALUE 2 |
|---|---|---|---|---|---|---|
| 10/2 8:05:34 | TV 1 | LIVING ROOM | OPERATIONAL STATUS | ON | | |
| 10/2 8:35:28 | IH COOKING APPLIANCE 1 | KITCHEN | OPERATIONAL STATUS | ON | HEATING POWER | HIGH |
| 10/2 8:35:45 | TV 1 | LIVING ROOM | OPERATIONAL STATUS | OFF | | |
| 10/2 8:36:07 | VENTILATING FAN 1 | KITCHEN | OPERATIONAL STATUS | ON | LEVEL | 2 |
| 10/2 8:37:39 | IH COOKING APPLIANCE 1 | KITCHEN | HEATING POWER LEVEL | LOW | | |
| 10/2 8:37:51 | VENTILATING FAN 1 | KITCHEN | LEVEL | 1 | | |
| 10/2 8:47:53 | IH COOKING APPLIANCE 1 | KITCHEN | HEATING POWER LEVEL | HIGH | | |
| 10/2 8:48:02 | VENTILATING FAN 1 | KITCHEN | LEVEL | 2 | | |
| 10/2 9:05:30 | IH COOKING APPLIANCE 1 | KITCHEN | OPERATIONAL STATUS | OFF | | |
| 10/2 9:05:56 | VENTILATING FAN 1 | KITCHEN | OPERATIONAL STATUS | OFF | | |
| 10/2 9:10:24 | LIGHTING 6 | ROOM 2 | OPERATIONAL STATUS | ON | | |
| 10/2 9:15:16 | LIGHTING 6 | ROOM 2 | OPERATIONAL STATUS | OFF | | |
| 10/2 9:23:55 | ELECTRIC LOCK 1 | KITCHEN | LOCK STATUS | CLOSE | | |
| 10/2 9:24:49 | LIGHTING 2 | ENTRANCE | OPERATIONAL STATUS | OFF | | |
| 10/2 9:25:33 | HUMAN DETECTION SENSOR 1 | ENTRANCE | DETECTION STATUS | ON | | |
| 10/2 9:25:34 | HUMAN DETECTION SENSOR 1 | ENTRANCE | DETECTION STATUS | OFF | | |
| 10/2 9:26:13 | ELECTRIC LOCK 2 | ENTRANCE | LOCK STATUS | CLOSE | | |
| 10/2 11:20:12 | ELECTRIC LOCK 2 | ENTRANCE | LOCK STATUS | OPEN | | |
| 10/2 11:20:24 | HUMAN DETECTION SENSOR 1 | ENTRANCE | DETECTION STATUS | ON | | |
| 10/2 11:20:25 | HUMAN DETECTION SENSOR 1 | ENTRANCE | DETECTION STATUS | OFF | | |

FIG.6

OPERATIONAL STATUS DATA

| DATE | DEVICE NAME | INSTALLED LOCATION | PROPERTY 1 | PROPERTY VALUE 1 | PROPERTY 2 | PROPERTY VALUE 2 | ... |
|---|---|---|---|---|---|---|---|
| 10/2 8:37:07 | VENTILATING FAN 1 | KITCHEN | OPERATIONAL STATUS | ON | LEVEL | 2 | |
| 10/2 8:37:24 | LIGHTING 6 | ROOM | OPERATIONAL STATUS | ON | | | |
| 10/2 8:37:39 | IH COOKING APPLIANCE 1 | KITCHEN | OPERATIONAL STATUS | ON | HEATING POWER | HIGH | |

FIG.7

INTERMEDIATE DATA

| EXTRACTION CONDITION | DATE | DEVICE NAME | INSTALLED LOCATION | PROPERTY 1 | PROPERTY VALUE 1 | PROPERTY 2 | PROPERTY VALUE 2 |
|---|---|---|---|---|---|---|---|
| TRIGGER DEVICE | 10/2 8:35:28 | IH COOKING APPLIANCE 1 | KITCHEN | OPERATIONAL STATUS | ON | HEATING POWER | HIGH — 701 |
| LINKED DEVICE | 10/2 8:36:07 | VENTILATING FAN 1 | KITCHEN | OPERATIONAL STATUS | ON | LEVEL | 2 — 702 |

FIG.8

ASSOCIATED CONTROL INFORMATION

801

| | | CONDITION DATA | | | | |
|---|---|---|---|---|---|---|
| MANAGEMENT NUMBER | DEVICE NAME | INSTALLED LOCATION | PROPERTY 1 | PROPERTY VALUE 1 | PROPERTY 2 | PROPERTY VALUE 2 | CONTINUING TIME |
| 1 | IH COOKING APPLIANCE 1 | KITCHEN | OPERATIONAL STATUS | ON | — | — | (CHANGE OF STATUS) |

802

| | | | CONTROL DATA | | | | |
|---|---|---|---|---|---|---|---|
| MANAGEMENT NUMBER | CONTROL TIMING | DEVICE NAME | INSTALLED LOCATION | PROPERTY 1 | PROPERTY VALUE 1 | PROPERTY 2 | PROPERTY VALUE 2 |
| 1 | 0:00:39 | VENTILATING FAN 1 | KITCHEN | OPERATIONAL STATUS | ON | LEVEL | 2 |

FIG.10

INTERMEDIATE DATA

| EXTRACTION CONDITION | DATE | DEVICE NAME | INSTALLED LOCATION | PROPERTY 1 | PROPERTY VALUE 1 | PROPERTY 2 | PROPERTY VALUE 2 |
|---|---|---|---|---|---|---|---|
| TRIGGER DEVICE | 10/2 8:37:39 | IH COOKING APPLIANCE 1 | KITCHEN | OPERATIONAL STATUS | ON | HEATING POWER | HIGH |
| LINKED DEVICE | 10/2 8:37:07 | VENTILATING FAN 1 | KITCHEN | OPERATIONAL STATUS | ON | LEVEL | 2 |

FIG.11

OPERATIONAL STATUS LINK INFORMATION

| TRIGGER DEVICE | | | | LINKED DEVICE | | LINK INTERVAL |
|---|---|---|---|---|---|---|
| DEVICE TYPE | PROPERTY | PROPERTY VALUE | INSTALLED LOCATION | DEVICE TYPE | INSTALLED LOCATION | |
| IH COOKING APPLIANCE | HEATING POWER LEVEL | \<CHANGE\> | KITCHEN | VENTILATING FAN | KITCHEN | FROM 1 MIN BEFORE TO 1 MIN LATER |

FIG.12

INTERMEDIATE DATA

| EXTRACTION CONDITION | DATE | DEVICE NAME | INSTALLED LOCATION | PROPERTY 1 | PROPERTY VALUE 1 | PROPERTY 2 | PROPERTY VALUE 2 | |
|---|---|---|---|---|---|---|---|---|
| TRIGGER DEVICE | 10/2 8:37:39 | IH COOKING APPLIANCE 1 | KITCHEN | HEATING POWER LEVEL | LOW | — | — | ←1201 |
| LINKED DEVICE | 10/2 8:37:51 | VENTILATING FAN 1 | KITCHEN | LEVEL | 1 | — | — | ←1202 |
| TRIGGER DEVICE | 10/2 8:47:53 | IH COOKING APPLIANCE 1 | KITCHEN | HEATING POWER LEVEL | HIGH | — | — | ←1203 |
| LINKED DEVICE | 10/2 8:48:02 | VENTILATING FAN 1 | KITCHEN | LEVEL | 2 | — | — | ←1204 |

FIG.13

ASSOCIATED CONTROL INFORMATION

| | | | CONDITION DATA | | | | |
|---|---|---|---|---|---|---|---|
| MANAGEMENT NUMBER | DEVICE NAME | INSTALLED LOCATION | PROPERTY 1 | PROPERTY VALUE 1 | PROPERTY 2 | PROPERTY VALUE 2 | CONTINUING TIME |
| 2 | IH COOKING APPLIANCE 1 | KITCHEN | HEATING POWER LEVEL | LOW | — | — | (CHANGE OF STATUS) |
| 3 | IH COOKING APPLIANCE 1 | KITCHEN | HEATING POWER LEVEL | HIGH | — | — | (CHANGE OF STATUS) |

| | | CONTROL DATA | | | | | |
|---|---|---|---|---|---|---|---|
| MANAGEMENT NUMBER | CONTROL TIMING | DEVICE NAME | INSTALLED LOCATION | PROPERTY 1 | PROPERTY VALUE 1 | PROPERTY 2 | PROPERTY VALUE 2 |
| 2 | 0:00:12 | VENTILATING FAN 1 | KITCHEN | LEVEL | 1 | — | — |
| 3 | 0:00:09 | VENTILATING FAN 1 | KITCHEN | LEVEL | 2 | — | — |

FIG.14

DEVICE TYPE INFORMATION

| DEVICE TYPE | FUNCTION 1 | FUNCTION 2 | FUNCTION 3 |
|---|---|---|---|
| TV | TV | — | — |
| VENTILATING FAN | VENTILATION | — | — |
| LIGHTING | ILLUMINATION ADJUSTMENT | — | — |
| SPEAKER | SPEAKER | — | — |
| ELECTRIC LOCK | LOCKING | — | — |
| AIR CONDITIONER | HEATING | COOLING | AIR BLOW |
| FLOOR HEATING | HEATING | — | — |
| IH COOKING APPLIANCE | COOKING | — | — |
| MICROWAVE OVEN | COOKING | — | — |
| TELEPHONE | TELEPHONE CALL | — | — |
| BED SENSOR | HUMAN SENSOR | — | — |
| HUMAN DETECTION SENSOR | HUMAN SENSOR | — | — |
| REFRIGERATOR | REFRIGERATION | FREEZING | — |

FIG.15

OPERATIONAL STATUS LINK INFORMATION

| TRIGGER DEVICE | | | | LINKED DEVICE | | | LINK INTERVAL |
|---|---|---|---|---|---|---|---|
| FUNCTION | PROPERTY | PROPERTY VALUE | INSTALLED LOCATION | FUNCTION | INSTALLED LOCATION | | |
| COOKING | OPERATIONAL STATUS | ON | KITCHEN | VENTILATION | KITCHEN | | FROM 1 MIN BEFORE TO 5 MIN LATER |

ASSOCIATED CONTROL INFORMATION

| MANAGEMENT NUMBER | FUNCTION | CONDITION DATA ||||||
|---|---|---|---|---|---|---|
| | | INSTALLED LOCATION | PROPERTY 1 | PROPERTY VALUE 1 | PROPERTY 2 | PROPERTY VALUE 2 | CONTINUING TIME |
| 5 | COOKING | KITCHEN | OPERATIONAL STATUS | ON | — | — | (CHANGE OF STATUS) |

| MANAGEMENT NUMBER | CONTROL TIMING | FUNCTION | CONTROL DATA |||||
|---|---|---|---|---|---|---|---|
| | | | INSTALLED LOCATION | PROPERTY 1 | PROPERTY VALUE 1 | PROPERTY 2 | PROPERTY VALUE 2 |
| 5 | 0:00:29 | VENTILATION | KITCHEN | OPERATIONAL STATUS | ON | LEVEL | 2 |

FIG.17

INTERMEDIATE DATA

| EXTRACTION CONDITION | DATE | FUNCTION | INSTALLED LOCATION | PROPERTY 1 | PROPERTY VALUE 1 | PROPERTY 2 | PROPERTY VALUE 2 |
|---|---|---|---|---|---|---|---|
| TRIGGER DEVICE | 10/2 8:35:28 | COOKING | KITCHEN | OPERATIONAL STATUS | ON | HEATING POWER | HIGH |
| LINKED DEVICE | 10/2 8:36:07 | VENTILATION | KITCHEN | OPERATIONAL STATUS | ON | LEVEL | 2 |

OPERATIONAL STATUS LINK INFORMATION

| TRIGGER DEVICE | | | STATUS CONFIRMING DEVICE | | | | LINKED DEVICE | | LINK INTERVAL |
|---|---|---|---|---|---|---|---|---|---|
| DEVICE TYPE | PROPERTY | PROPERTY VALUE | INSTALLED LOCATION | DEVICE TYPE | PROPERTY | PROPERTY VALUE | STATUS CONFIRMING TIME | INSTALLED LOCATION | DEVICE TYPE | INSTALLED LOCATION | |
| ELECTRIC LOCK | LOCK STATUS | ON | ENTRANCE | HUMAN DETECTION SENSOR | DETECTION STATUS | OFF | 0-30 SEC LATER | ENTRANCE | ELECTRIC LOCK | KITCHEN | FROM 5 MIN BEFORE TO 0 | 1801 |
| BED SENSOR | DETECTION STATUS | ON | <ALL> | BED SENSOR | DETECTION STATUS | ON | 0-10 MIN LATER | <SAME ROOM> | LIGHTING | <SAME ROOM> | FROM 5 MIN BEFORE TO 5 MIN LATER | 1802 |

FIG.19

INTERMEDIATE DATA

| EXTRACTION CONDITION | DATE | DEVICE NAME | INSTALLED LOCATION | PROPERTY 1 | PROPERTY VALUE 1 | PROPERTY 2 | PROPERTY VALUE 2 | STATUS CONFIRMING TIME |
|---|---|---|---|---|---|---|---|---|
| TRIGGER DEVICE | 10/2 9:26:13 | ELECTRIC LOCK 2 | ENTRANCE | LOCK STATUS | CLOSE | — | — | — |
| STATUS CONFIRMING DEVICE | 10/2 9:25:34 | HUMAN DETECTION SENSOR 1 | ENTRANCE | DETECTION STATUS | OFF | — | — | 30 SEC |
| LINKED DEVICE | 10/2 9:23:55 | ELECTRIC LOCK 1 | KITCHEN | LOCK STATUS | CLOSE | — | — | — |

ASSOCIATED CONTROL INFORMATION

| | CONDITION DATA | | | | | | |
|---|---|---|---|---|---|---|---|
| MANAGEMENT NUMBER | DEVICE NAME | INSTALLED LOCATION | PROPERTY 1 | PROPERTY VALUE 1 | PROPERTY 2 | PROPERTY VALUE 2 | CONTINUING TIME |
| 6 | ELECTRIC LOCK 2 | ENTRANCE | KEY STATUS | ON | — | — | (CHANGE OF STATUS) |
| 6 | HUMAN DETECTION SENSOR 1 | ENTRANCE | DETECTION STATUS | OFF | — | — | 30 SEC |

| | CONTROL DATA | | | | | |
|---|---|---|---|---|---|---|
| MANAGEMENT NUMBER | CONTROL TIMING | DEVICE NAME | INSTALLED LOCATION | PROPERTY 1 | PROPERTY VALUE 1 | PROPERTY 2 | PROPERTY VALUE 2 |
| 6 | 0:00:00 | ELECTRIC LOCK 1 | KITCHEN | KEY STATUS | ON | — | — |

FIG.23

OPERATIONAL STATUS LINK INFORMATION

| TRIGGER DEVICE | | | | LINKED DEVICE | | | LINK INTERVAL | COVERED PERIOD |
|---|---|---|---|---|---|---|---|---|
| DEVICE TYPE | PROPERTY | PROPERTY VALUE | INSTALLED LOCATION | DEVICE TYPE | INSTALLED LOCATION | | | |
| AIR CONDITIONER | OPERATIONAL STATUS | ON | LIVING ROOM | ELECTRIC FAN | LIVING ROOM | | FROM 5 MIN BEFORE TO 10 MIN LATER | DECEMBER -FEBRUARY |

FIG.24

ASSOCIATED CONTROL INFORMATION

CONDITION DATA

| MANAGEMENT NUMBER | COVERED PERIOD | DEVICE NAME | INSTALLED LOCATION | PROPERTY 1 | PROPERTY VALUE 1 | PROPERTY 2 | PROPERTY VALUE 2 | CONTINUING TIME |
|---|---|---|---|---|---|---|---|---|
| 1 | MARCH -MAY | IH COOKING APPLIANCE 1 | KITCHEN | OPERATIONAL STATUS | ON | — | — | (CHANGE OF STATUS) |
| 2 | JUNE -AUGUST | IH COOKING APPLIANCE 1 | KITCHEN | OPERATIONAL STATUS | ON | — | — | (CHANGE OF STATUS) |
| 3 | SEPTEMBER -NOVEMBER | IH COOKING APPLIANCE 1 | KITCHEN | OPERATIONAL STATUS | ON | — | — | (CHANGE OF STATUS) |
| 4 | DECEMBER -JANUARY | IH COOKING APPLIANCE 1 | KITCHEN | OPERATIONAL STATUS | ON | — | — | (CHANGE OF STATUS) |

CONTROL DATA

| MANAGEMENT NUMBER | CONTROL TIMING | DEVICE NAME | INSTALLED LOCATION | PROPERTY 1 | PROPERTY VALUE 1 | PROPERTY 2 | PROPERTY VALUE 2 |
|---|---|---|---|---|---|---|---|
| 1 | 0:00:21 | VENTILATING FAN 1 | KITCHEN | OPERATIONAL STATUS | ON | LEVEL | 3 |
| 2 | 0:00:00 | VENTILATING FAN 1 | KITCHEN | OPERATIONAL STATUS | ON | LEVEL | 4 |
| 3 | 0:00:39 | VENTILATING FAN 1 | KITCHEN | OPERATIONAL STATUS | ON | LEVEL | 2 |
| 4 | 0:00:50 | VENTILATING FAN 1 | KITCHEN | OPERATIONAL STATUS | ON | LEVEL | 1 |

FIG.25

OPERATIONAL STATUS DATA

| DATE | OPERATOR | DEVICE NAME | INSTALLED LOCATION | PROPERTY 1 | PROPERTY VALUE 1 | PROPERTY 2 | PROPERTY VALUE 2 |
|---|---|---|---|---|---|---|---|
| 10/2 8:37:07 | TOSHIKO | IH COOKING APPLIANCE 1 | KITCHEN | OPERATIONAL STATUS | ON | HEATING POWER | HIGH |
| 10/2 8:37:39 | TOSHIKO | VENTILATING FAN 1 | KITCHEN | OPERATIONAL STATUS | ON | LEVEL | 2 |
| ... | | | | | | | |
| 10/5 6:15:17 | AKIO | IH COOKING APPLIANCE 1 | KITCHEN | OPERATIONAL STATUS | ON | HEATING POWER | HIGH |
| 10/5 6:15:22 | AKIO | VENTILATING FAN 1 | KITCHEN | OPERATIONAL STATUS | ON | LEVEL | 4 |

FIG.26

ASSOCIATED CONTROL INFORMATION

| | | | CONDITION DATA | | | | | | | CONTROL DATA | | | | | | |
|---|---|---|---|---|---|---|---|---|---|---|---|---|---|---|---|---|
| MANAGEMENT NUMBER | OPERATOR | DEVICE NAME | INSTALLED LOCATION | PROPERTY 1 | PROPERTY VALUE 1 | PROPERTY 2 | PROPERTY VALUE 2 | CONTINUING TIME | | MANAGEMENT NUMBER | CONTROL TIMING | DEVICE NAME | INSTALLED LOCATION | PROPERTY 1 | PROPERTY VALUE 1 | PROPERTY 2 | PROPERTY VALUE 2 |
| 1 | TOSHIKO | IH COOKING APPLIANCE 1 | KITCHEN | OPERATIONAL STATUS | ON | — | — | (CHANGE OF STATUS) | | 1 | 0:00:32 | VENTILATING FAN 1 | KITCHEN | OPERATIONAL STATUS | ON | LEVEL | 2 |
| 2 | AKIO | IH COOKING APPLIANCE 1 | KITCHEN | OPERATIONAL STATUS | ON | — | — | (CHANGE OF STATUS) | | 2 | 0:00:05 | VENTILATING FAN 1 | KITCHEN | OPERATIONAL STATUS | ON | LEVEL | 4 |

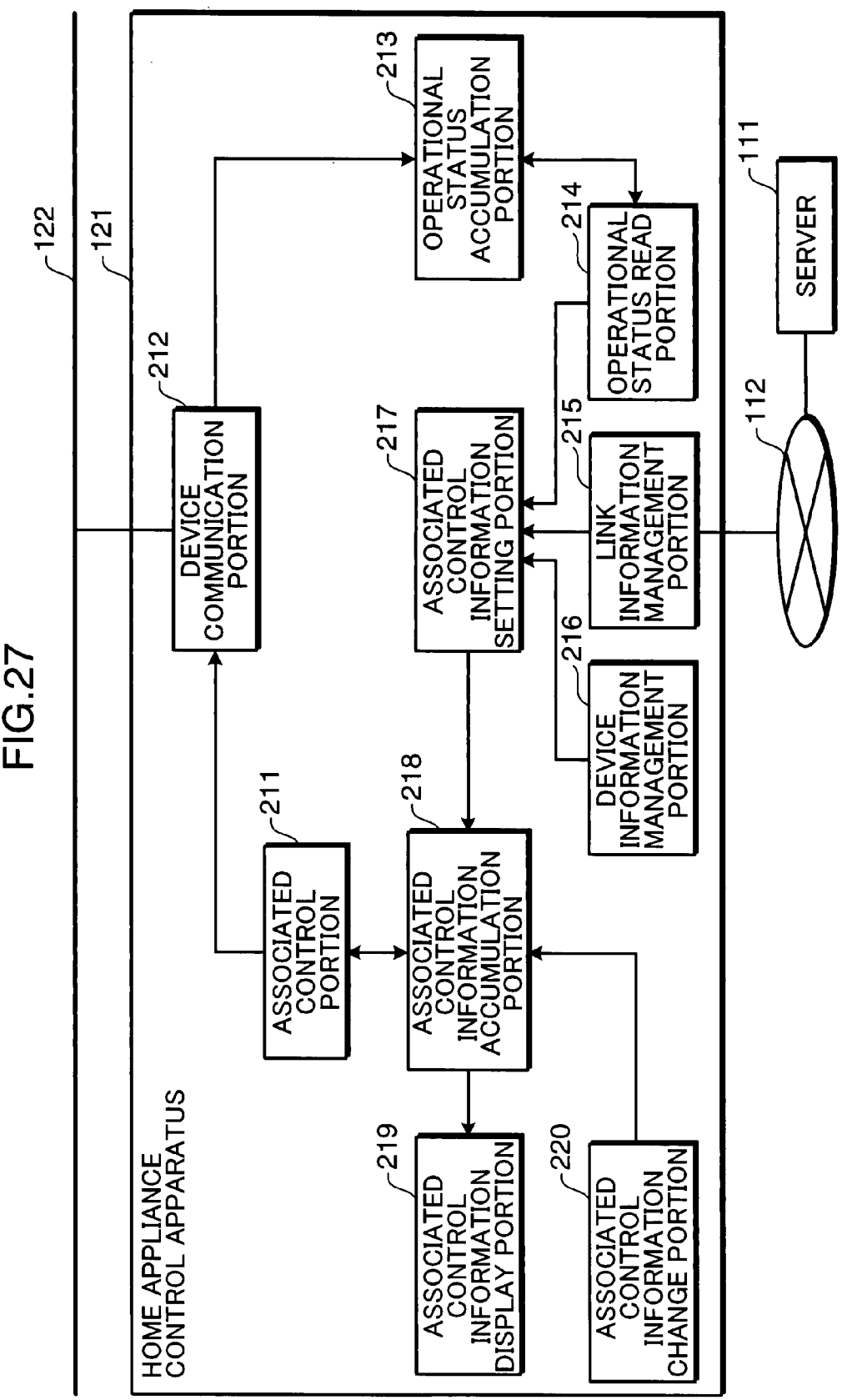

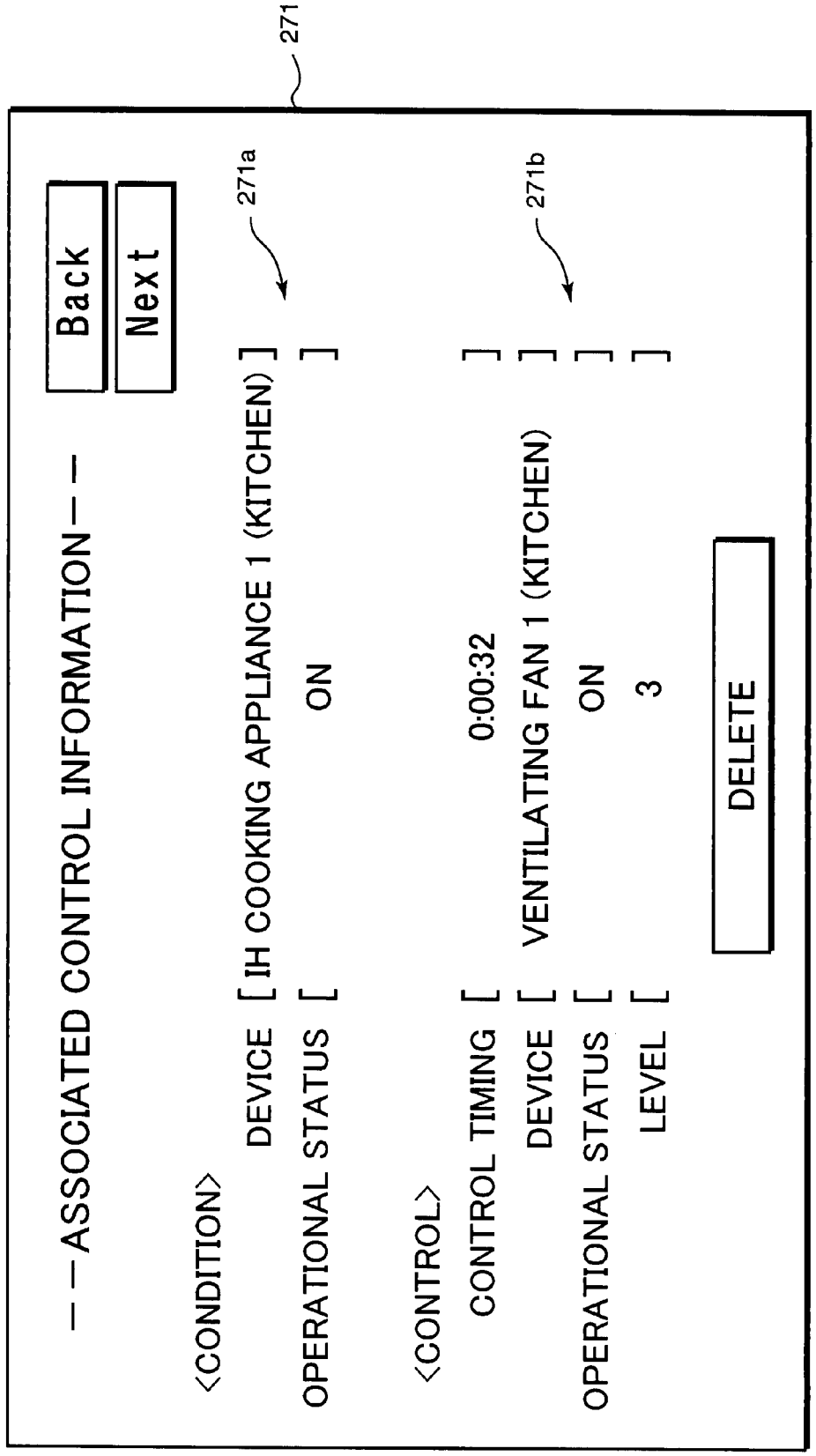

US 7,822,489 B2

ELECTRONIC DEVICE CONTROL APPARATUS, METHOD FOR CONTROLLING ELECTRONIC DEVICE, ELECTRONIC DEVICE CONTROL PROGRAM, AND COMPUTER-READABLE RECORDING MEDIUM HAVING RECORDED ELECTRONIC DEVICE CONTROL PROGRAM

TECHNICAL FIELD

The present invention relates to an electronic device control apparatus, a method for controlling an electronic device, an electronic device control program, and a computer-readable recording medium having recorded an electronic device control program for managing and controlling the status of an electronic device, and more particularly, to an electronic device control apparatus, a method for controlling an electronic device, an electronic device control program, and a computer-readable recording medium having recorded an electronic device control program for enabling associated control of another electronic device upon a change of the operational status of a given electronic device as a trigger.

BACKGROUND ART

Regarding a method for setting associated control of home appliances, as a pattern setting method to control home appliances upon a button operation on a home appliance control apparatus as a trigger, there has been used a method for making the settings by storing contents of operations through sequential operations on plural home appliances (for example, Patent Document 1).

Also, there has been used a method for creating a control table to control home appliances by acquiring a model table from a server and developing the model table while establishing a correspondence with home appliances connected to the network (for example, Patent Document 2).

The method in the related art involving the sequential operations on home appliances, however, has problems in that it is necessary to determine in advance which appliance is to be placed under associated control and in which manner before the operations, a setting constructor has to consider associated control to enable the control that suits the life pattern of the user, and further, when he makes an error during the operations, he has to perform the operations again. Meanwhile, although the method involving the acquisition of the model table from the server is suitable to enable user-independent uniform control, it is necessary to set and manage the control data in the server in order to enable diverse control that meets the needs of individual users. This method, therefore, has a problem that it is not suitable to enable diverse control for each user.

Patent Document 1: Japanese Patent No. 2916020
Patent Document 2: JP-A-2003-274033

DISCLOSURE OF THE INVENTION

The invention is to solve the problems in the related art as discussed above, and therefore has an object to provide an electronic device control apparatus, a method for controlling an electronic device, an electronic device control program, and a computer-readable recording medium having recorded an electronic device control program for achieving the settings to enable associated control that suits the life pattern of the user and the characteristics of connected electronic devices with ease and precision.

An electronic device control apparatus according to one aspect of the invention is an electronic device control apparatus that controls an electronic device, including: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

A method for controlling an electronic device according to another aspect of the invention is a method for controlling an electronic device, including: a reception step of receiving operational status data containing an operational status of each electronic device; an operational status data accumulation step of accumulating the operational status data received in the reception step; a link information management step of managing operational status link information containing trigger device information to specify an operational status of a single electronic device among plural electronic devices, and linked device information to specify another electronic device that activates in association with the operational status of the single electronic device; an operational status data extraction step of extracting operational status data corresponding to an operational status in the trigger device information contained in the operational status link information and extracting operational status data corresponding to the linked device information contained in the operational status link information, both from the operational status data accumulated in the operational status data accumulation step; an associated control information generation step of generating, according to the operational status data extracted in the operational status data extraction step, associated control information containing the operational status of the single electronic device and used as a condition to start associated control of the single electronic device and the another electronic device and a content of control on the another electronic device; an associated control information accumulation step of accumulating the associated control information generated in the associated control information generation step; and an associated control step of enabling associated control of the electronic devices according to the associated control information accumulated in the associated control information accumulation step.

An electronic device control program according to still another aspect of the invention is an electronic device control program to control an electronic device, which causes a computer to function as follows: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

A computer-readable recording medium having recorded an electronic device control program according to still another aspect of the invention is a computer-readable recording medium having recorded an electronic device control program to control an electronic device, wherein the computer-readable recording medium has recorded an electronic device control program that causes a computer to function as follows: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

According to these configurations, the operational status data containing the operational status of each electronic device is received, and the received operational status data is accumulated. Also, the operational status link information is managed, which contains trigger device information to specify the operational status of a single electronic device among plural electronic devices and linked device information to specify another electronic device that activates in association with the operational status of the single electronic device. The operational status data corresponding to the operational status in the trigger device information contained in the operational status link information is extracted, and the operational status data corresponding to the linked device information contained in the operational status link information is extracted, both from the accumulated operational status data. Subsequently, the associated control information is generated according to the extracted operational status data, which contains the operational status of the single electronic device and is used as the condition to start the associated control of the single electronic device and the another electronic device and the content of the control on the another electronic device, and the associated control information thus generated is accumulated. Thereafter, associated control of the electronic devices is enabled according to the accumulated associated control information.

Hence, according to the invention, by generating information about the condition and the control to enable the associated control according to the operational statuses of the home appliances actually used in the house, it is possible to enable the associated control that suits the life pattern of the user and the characteristics of the connected electronic devices, which makes it possible to make the settings precisely so as not to cause inconsistency in the condition and the operations of the associated control. In addition, because information about the condition and the control to enable the associated control is automatically generated by using the operational status link information to extract the information for the associated control, the user or the system constructor is able to make the settings of the associated control with ease without having to perform operations.

The above and other objects, features, and advantages of the invention will become more apparent from the following detailed description with reference to the accompanying drawings.

BRIEF DESCRIPTION OF THE DRAWINGS

FIG. 1 is view showing the configuration of a home network system according to one embodiment of the invention.

FIG. 2 is a view showing the configuration of a home appliance control apparatus according to one embodiment of the invention.

FIG. 3 is a view showing one example of connected device information.

FIG. 4 is a view showing one example of operational status link information.

FIG. 5 is a view showing one example of operational status data.

FIG. 6 is a view showing another example of the operational status data.

FIG. 7 is a view showing one example of intermediate data generated according to the operational status data of FIG. 5.

FIG. 8 is a view showing one example of associated control information.

FIG. 10 is a view showing one example of intermediate data generated according to the operational status data of FIG. 6.

FIG. 11 is a view showing one example of the operational status link information.

FIG. 12 is a view showing one example of the intermediate data.

FIG. 13 is a view showing one example of the associated control information.

FIG. 14 is a view showing one example of device type information.

FIG. 15 is a view showing one example of the operational status link information in which the function is designated.

FIG. 16 is a view showing one example of the associated control information in which the function is designated.

FIG. 17 is a view showing one example of the intermediate data.

FIG. 18 is a view showing one example of the operational status link information containing status confirming device information.

FIG. 19 is a view showing one example of the intermediate data.

FIG. 20 is a view showing one example of the associated control information containing plural pieces of condition data.

FIG. 23 is a view showing one example of the operational status link information containing a covered period.

FIG. 24 is a view showing one example of the associated control information containing the covered period.

FIG. 25 is a view showing one example of the operational status data containing information to identify an operator.

FIG. 26 is a view showing one example of the associated control information containing information to identify an operator.

FIG. 27 is a view showing another configuration of the home appliance control apparatus according to one embodiment of the invention.

FIG. 28 is a view showing one example of an associated control information display screen.

BEST MODE FOR CARRYING OUT THE INVENTION

Figure 9:
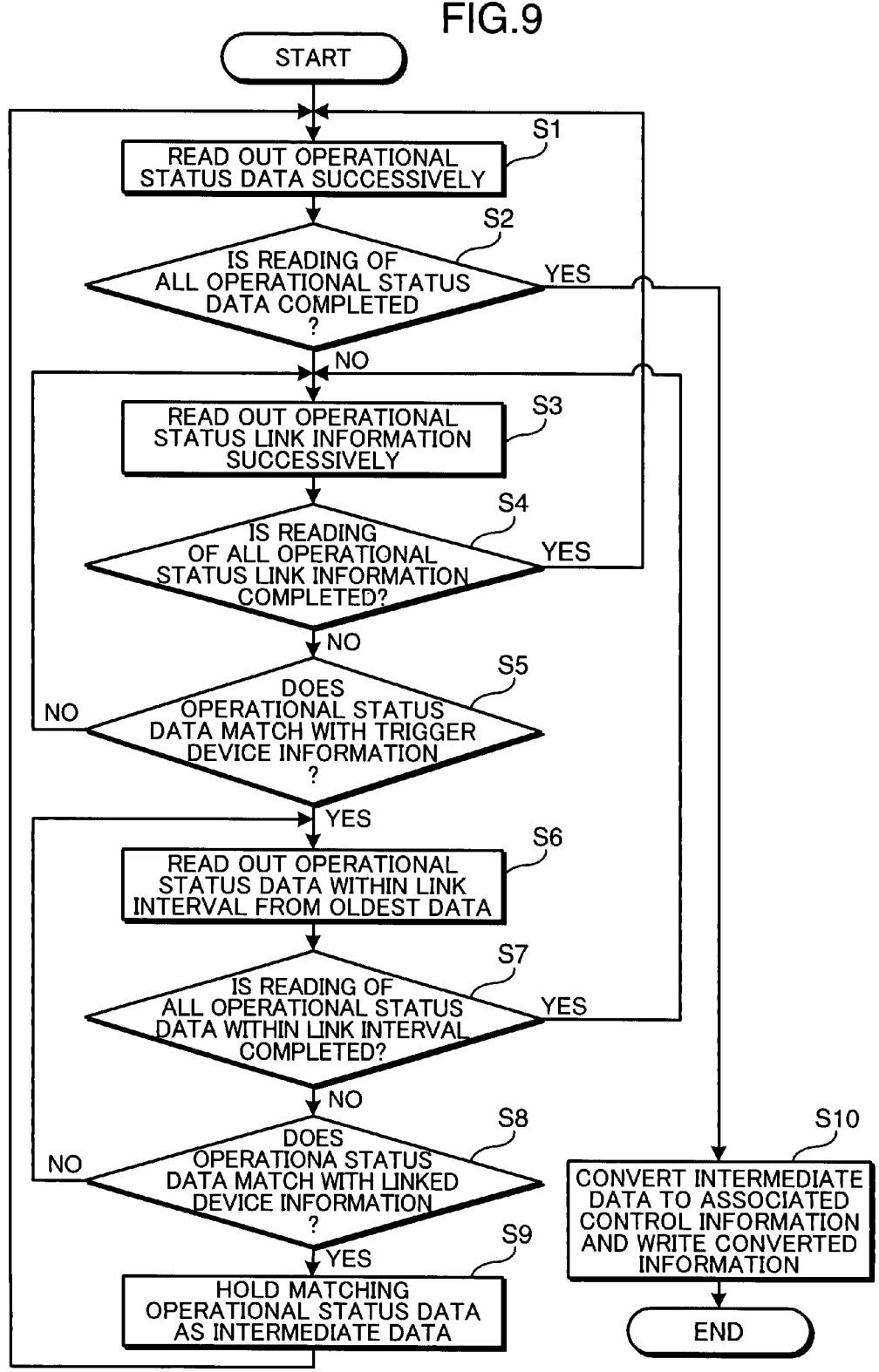
FIG. 9 is a flowchart used to describe the processing by an associated control information setting portion.

Hereinafter, embodiments of the invention will be described with reference to the drawings.

First Embodiment

FIG. 1 is a view showing the configuration of a home network system according to one embodiment of the invention. In a home network area 113, plural network home appliances (hereinafter, referred to also as home appliances or devices) 131 are connected to a home network 122, and a home appliance control apparatus 121 that controls these network home appliances 131 is also connected thereto. In addition, an outside server 111 is connected to the home appliance control apparatus 121 via an outside network 112.

The home appliances 131 are, for example, electric locks, lights, IH (Induction Heating) cooking appliances, human detection sensors, and so forth. In this embodiment, besides the home appliances, devices, such as sensors and meters that measure and detect the house equipment and the living environments (for example, the gas meter, the water meter, the electric power meter, etc.), may be connected to the home network 122.

The outside network 112 is an outside communication network comprising a switched line or a private line, such as a telephone line and a digital line. The outside network 112, however, is not particularly limited to the examples above, and various wide area networks can be also used. A private line, other public lines, the Internet, and so forth can be used as well, and either a cable or wireless method can be used. In addition, the home network 122 can use either a cable or wireless method.

FIG. 2 is a view showing the configuration of the home appliance control apparatus according to the first embodiment of the invention. The home appliance control apparatus 121 connected to the home network 122 includes an associated control portion 211, a device communication portion 212, an operational status accumulation portion 213, an operational status read portion 214, a link information management portion 215, a device information management portion 216, an associated control information setting portion 217, and an associated control information accumulation portion 218.

The device communication portion 212 makes communications with each home appliance 131 and outputs the received operational status of the home appliance 131 to the operational status accumulation portion 213. Each home appliance 131 transmits the current operational status to the home appliance control apparatus 121 periodically or upon a change of the operational status. The operational status accumulation portion 213 accumulates the operational status received at the device communication portion 212 as operational status data. The operational status read portion 214 reads out the operational status data from the operational status accumulation portion 213.

The link information management portion 215 holds operational status link information, which is the information to correlate plural pieces of operational status data with one another and used as the condition under which data needed to enable associated control is extracted. To be more specific, the link information management portion 215 assumes a device having the operational status data used as a trigger for establishing a correlation in the associated control as a trigger device and a device correlated with the trigger device as a linked device, and stores a linked interval together with the device type, the installed location, and property information specifying the type of operational status of each device. The link interval indicates the maximum detection time to correlate the time at which the operational status of the trigger device has changed with the time at which the operational status of the linked device has changed. The link information management portion 215 is connected to the outside server 111 via the outside network 112 to enable mutual communications.

The link information management portion 215 is furnished with a function of acquiring the operational status link information from the outside server 111. This allows the user to save the trouble of updating the operational status link information, and enables the link information management portion 215 to store the latest operational status link information always. The device information management portion 216 holds device type information specifying device types of devices connected to the home network and functions assigned to each device type, or connected device information specifying the device names, device types, and the installed locations of devices connected to the home network.

The associated control information setting portion 217 sets associated control information described below into the associated control information accumulation portion 218 by extracting data to enable associated control of the network home appliances from the operational status data acquired by means of the operational status read portion 214 using the operational status link information acquired by means of the link information management portion 215 and the connected device information and the device type information acquired by means of the device information management portion 216. The associated control information is referred to by the associated control portion 211. The associated control portion 211 having acquired the operational status from the device communication portion 212 enables associated control of the network home appliances by means of the device control portion according to the control data in the associated control information when the acquired operational status data coincides with the condition data in the associated control information.

In this embodiment, the home appliance control apparatus 121 corresponds to one example of the electronic device control apparatus, the device communication portion 212 corresponds to one example of the reception means, the operational status accumulation portion 213 corresponds to one example of the operational status data accumulation means, the link information management portion 215 corresponds to one example of the link information management means, the operational status read portion 214 corresponds to one example of the operational status data extraction means, the associated control information setting portion 217 corresponds to one example of the associated control information creation means, the associated control information accumulation portion 218 corresponds to one example of the associated control information accumulation means, the device information management portion 216 corresponds to one example of the device information storage means, and the associated control portion 211 corresponds to one example of the associated control means.

FIG. 3 is a view showing one example of the connected device information. Devices with the device names specified in this list are installed at locations specified as the installed locations. FIG. 4 is a view showing one example of the operational status link information. The operational status link information comprises: information about the trigger device that serves as a trigger to correlate pieces of operational status data with one another, including the device type, the installed location, the property specifying the type of operational status, and the property value indicating the value of the property; information about the linked device correlated with the trigger device, including the device type and the installed location; and the link interval indicating the maximum detection time within which two operational statuses are correlated with each other. FIG. 5 and FIG. 6 are views showing one example of the operational status data. The operational status data comprises the date when a change of the operational status occurred, the device name of the device having undergone a change of the operational status, the installed location of the device, the property 1 and the property 2 specifying the types of operational status, and the property value 1 and the property value 2 indicating the values of the respective properties. It should be noted that the property 2 and the property value 2 hold values only when a change occurs simultaneously with a change of the property 1.

FIG. 7 is a view showing one example of intermediate data that the associated control information setting portion 217 holds inside while performing processing. The intermediate data comprises an extraction condition indicating whether the operational status data is extracted as the trigger device or as the linked device and information about the extracted operational status data. FIG. 8 is a view showing one example of the associated control information. The associated control information comprises condition data used as the condition to start the associated control of a single electronic device and another electronic device, and control data used to enable the control. The condition data comprises the device name, the installed location, the property 1 and the property 2 specifying the types of operational status, and the property value 1 and the property value 2 indicating the values thereof. It should be noted that this embodiment shows a case where neither the property 2 nor the property value 2 holds a value. The control data comprises the control timing as a time to start the control since the condition has been satisfied, the device name and the installed location of the device to be controlled, and as the information to be controlled, the property 1 and the property 2 specifying the types of operational status and the property value 1 and the property value 2 indicating the values thereof. In addition, a management number to correlate the condition data with the control data is assigned to each of the condition data and the control data.

FIG. 9 is a flowchart used to describe the processing by the associated control information setting portion 217. The processing to set the associated control information of FIG. 8 by generating the intermediate data of FIG. 7 from the operational status data of FIG. 5 according to the operational status link information of FIG. 4 will be described using the flowchart of FIG. 9.

Initially, in Step S1, the associated control information setting portion 217 successively reads out the operational status data from the operational status accumulation portion 213 by means of the operational status read portion 214. Herein, the operational status data 511 of FIG. 5 is read out first. Subsequently, in Step S2, the associated control information setting portion 217 judges whether reading of all the operational status data is completed. The associated control information setting portion 217 judges that reading of all the operational status data is completed when there is no more operational status data to be read out. Upon judging that reading of all the operational status data is not completed (NO in Step S2), the associated control information setting portion 217 proceeds to the processing in Step S3, and upon judging that reading of all the operational status data is completed (YES in Step S2), it proceeds to the processing in Step S10. Herein, because reading of all the operational status data is not completed, the associated control information setting portion 217 proceeds to the processing in Step S3.

Subsequently, in Step S3, the associated control information setting portion 217 successively reads out the operational status link information from the link information management portion 215. Herein, the operational status link information 411 of FIG. 4 is read out first. Subsequently, in Step S4, the associated control information setting portion 217 judges whether reading of all the operational status link information is completed. The associated control information setting portion 217 judges that reading of all the operational status link information is completed when there is no more operational status link information to be read out. Upon judging that reading of all the operational status link information is not completed (NO in Step S4), the associated control information setting portion 217 proceeds to the processing in Step S5, and upon judging that reading of all the operational status link information is completed (YES in Step S4), it returns to the processing in Step S1. Herein, because reading of all the operational status link information is not completed, the associated control information setting portion 217 proceeds to the processing in Step S5.

Subsequently, in Step S5, the associated control information setting portion 217 judges whether the operational status data matches with the trigger device information in the operational status link information. Upon judging that the operational status data matches with the trigger device information in the operational status link information (YES in Step S5), the associated control information setting portion 217 proceeds to the processing in Step S6, and upon judging that the operational status data does not match with the trigger device information in the operational status link information (NO in Step S5), it returns to the processing in Step S3. From the connected device information acquired from the device information management portion 216, it is understood that the device name, "TV1", in the operational stats data 511 is of the device type, "TV". Because it does not coincide with the device type, "IH cooking appliance", of the trigger device in the operational status link information 411, the matching is not judged. Subsequently, the associated control information setting portion 217 performs the processing in Step S3 again to acquire the operational status link information 412. Further, as with the case of the operational status link information 411, the matching is not judged in Step S5 in which whether the operational status data matches with the trigger device information in the operational status link information is judged. Although the associated control information setting portion 217 makes an attempt to perform the processing in Step S3, it judges that reading has been completed and there is no coinciding data. The associated control information setting portion 217 therefore performs the processing in Step S1 to read out the operational status data 512.

Subsequently, the associated control information setting portion 217 performs the processing in Step S3 to acquire the operational status link information 411. Subsequently, in Step S5, it judges that "device name: IH cooking appliance 1" in the operational status data 512 is of the "device type: IH cooking appliance" from the connected device information. Further, it judges that the operational status data 512 exhibits "installed location: kitchen", "property 1: operational status", and "property value: 1", and therefore judges the coincidence with the trigger device information in the operational status link information 411.

Subsequently, in Step S6, the associated control information setting portion 217 successively reads out the operational status data within the link interval in the operational status link information from the oldest data by means of the operational status read portion 214. The associated control information setting portion 217 reads out the operational status data dated after "10/2 8:34:28" and before "10/2 8:40:28" according to the information, "from one minute before to five minutes later", specified as the link interval in the operational status link information 411 and the information about the date, "10/2 8:35:28", in the operational status data 512 by means of the operational status read portion 214. The operational status data 511 is read out first.

Subsequently, in Step S7, the associated control information setting portion 217 judges whether reading of all the operational status data within the link interval is completed. The associated control information setting portion 217 judges that reading of all the operational status data within the link interval is completed when there is no more operational status data to be read out. Upon judging that reading of all the operational status data within the link interval is not completed (NO in Step S7), the associated control information setting portion 217 proceeds to the processing in Step S8, and upon judging that reading of all the operational status data within the link interval is completed (YES in Step S7), it returns to the processing in Step S3. Herein, because reading of all the operational status data within the link interval is not completed, the associated control information setting portion 217 proceeds to the processing in Step S8.

In Step S8, the associated control information setting portion 217 judges whether the operational status data matches with the linked device information in the operational status link information. Upon judging that the operational status data matches with the linked device information in the operational status link information (YES in Step S8), the associated control information setting portion 217 proceeds to the processing in Step S9, and upon judging that the operational status data does not match with the linked device information in the operational status link information (NO in Step S8), it returns to the processing in Step S6. In this step, whether the operational status data 511 matches with the linked device in the operational status link information 411 is judged. It is understood that because the device type is "TV" from the connected device information, the associated control information setting portion 217 judges that it does not match with "ventilating fan" specified as the device type of the linked device in the operational status link information 411. Hence, the operational status information setting portion 217 performs the processing in Step S6 again to read out the following operational status data 513. The associated control information setting portion 217 then performs the processing in Step S8, and judges that the operational status data 513 does not match with the linked device, either. The associated control information setting portion 217 then performs the processing in Step S6 again to read out the following operational status data 514.

In Step S8, it is understood that "device name: ventilating fan 1" in the operational status data 514 is of "device type: ventilating fan" from the connected device information. Further, because the operational status data 514 exhibits "installed location: kitchen", the coincidence with the linked device information in the operational status link information 411 is judged. Accordingly, in Step S9, the associated control information setting portion 217 holds the matching operational status data as intermediate data. The associated control information setting portion 217 generates intermediate data 701 and 702 shown in FIG. 7 from the extracted operational status data 512 and 514, respectively. After this processing, processing in Step S1 through Step S9 is performed according to the flow to generate the intermediate data of FIG. 7 until there is no more operational status data to be read out successively in Step S1.

Subsequently, in Step S10, when reading of all the operational status data is completed, the associated control information setting portion 217 converts the intermediate data to the associated control information and writes this associated control information into the associated control information accumulation portion 218. The associated control information setting portion 217 sets the device name and the installed location in the intermediate data 701 extracted as the trigger device, and the property information comprising the property 1 and the property value 1 specified in the operational status link information 411 as the condition data 801 in the associated control information. Also, the associated control information setting portion 217 sets the device name and the installed location in the intermediate data 702 extracted as the linked device and respective pieces of property information as the control data 802 in the associated control information. Further, the associated control information setting portion 217 sets an elapsed time since the operational status data 512 is generated until the operational status data 514 is generated in the control timing in the control data 802. Furthermore, the associated control information setting portion 217 assigns the same management number to both the condition data 801 and the control data 802 to set the associated control information. In this manner, the associated control information shown in FIG. 8 is generated.

In Step S10, the associated control information setting portion 217 sets the property information comprising the property 1 and the property value 1 specified in the operational status link information 411 as the associated control information. However, all the property information also including the property information comprising the property 2 and the property value 2 may be set in the condition data.

In the case of the operational status data of FIG. 6, as with the case of the operational status data of FIG. 5, intermediate data of FIG. 10 is extracted according to the operational status link information of FIG. 4 and the associated control information is also generated by the associated control information setting portion 217. In this case, because a change occurs in the operational status of the linked device before the trigger device, 0 second is set as the control timing in the control data.

The associated control portion 211 then enables the associated control of the home appliances 131 according to the associated control information accumulated in the associated control information accumulation portion 218. Herein, the associated control enabled by the associated control portion 211 will be described using FIG. 8. For example, when the operational status of the IH (Induction Heating) cooking appliance 1 installed in the kitchen is switched ON, the home appliance (IH cooking appliance 1) 131 transmits the operational status data to the home appliance control apparatus 121. The device communication portion 212 receives the operational status data and outputs the received operational status data to the associated control portion 211. The associated control portion 211 successively reads out the condition data contained in the associated control information accumulated in the associated control information accumulation portion 218, and judges whether the received operational status data coincides with the condition data.

Upon judging that the operational status data coincides with the condition data, the associated control portion 211 reads out the control data corresponding to the condition data, and controls the home appliance 131 at the control timing contained in this control data. For example, when the operational status of the IH cooking appliance 1 installed in the kitchen is switched ON, the operational status of the ventilating fan 1 installed in the kitchen comes ON 39 seconds later and a quantity of airflow is set to Level 2. When the associated control portion 211 judges that the operational status data does not coincide with the condition data, it successively reads out the condition data until there is no more condition data to be read out. When reading of all the condition data is completed, because there is no home appliance to be placed under the associated control, the associated control 211 ends the processing without enabling the associated control.

In this manner, the operational status data containing the operational status of the home appliance is received, and the received operational status data is accumulated. Also, the operational status link information is managed, which contains the trigger device information to specify the operational status of a single home appliance among plural home appliances and the linked device information to specify another home appliance that activates in association with the operational status of the single home appliance. The operational status data corresponding to the operational status in the trigger device information contained in the operational status link information is extracted, and the operational status data corresponding to the linked device information contained in the operational status link information is extracted, both from the accumulated operational status data. Subsequently, the associated control information is generated according to the extracted operational status data, which contains the operational status of the single home appliance and used as the condition to start the associated control of the single home appliance and the another home appliance and the content of the control on the another home appliance, and the associated control information thus generated is accumulated. Subsequently, the associated control of the home appliances is enabled according to the accumulated associated control information.

By generating information about the condition and the control to enable the associated control according to the operational statuses of the home appliances used actually in the house, it is possible to enable the associated control that suits the life pattern of the user and the characteristics of the connected home appliances, which makes it possible to make the settings precisely so as not to cause inconsistency in the condition and the operations of the associated control. In addition, because information about the condition and the control to enable the associated control is automatically generated by using the operational status link information to extract the information for the associated control, the user or the system constructor is able to make the settings of the associated control with ease without having to perform operations.

Also, the operational status data further contains the time at which the operational status of the home appliance has changed, and the operational status link information further contains the link interval to judge the correlation with a single home appliance. Further, the operational status data corresponding to the operational status in the trigger device information contained in the operational status link information is extracted, and the operational status data corresponding to the linked device information contained in the operational status link information is extracted within the link interval contained in the operational status link information, both from the accumulated operational status data.

Hence, because the operational status data corresponding to the operational status in the linked device information is extracted within the link interval to judge the correlation with a single home appliance, it is possible to extract exactly the operational status data of another home appliance that activates in association with the operational status of the single home appliance.

The operational status data further contains the device name unique to each home appliance. The trigger device information contains the device type or the function of the single home appliance. The linked device information contains the device type or the function of another home appliance. Also, the device name of the home appliance and the device type of the home appliance are stored in the device information management portion 216 with a correspondence established therebetween. As a reference is made to the device information management portion 216, the device type corresponding to the device name contained in the operational status data is specified. The operational status data corresponding to the operational status in the trigger device information contained in the operational status link information is extracted and the operational status data corresponding to the linked device information contained in the operational status link information is extracted, both from the accumulated operational status data.

Because the device name of the home appliance and the device type of the home appliance are stored with a correspondence established therebetween, there is no need to rewrite the linked device information each time a new home appliance is connected, which can save the labor of the user.

Further, because the associated control of the home appliances is enabled according to the accumulated associated control information, another home appliance is automatically activated in association with the home appliance the user has operated. It is thus possible to enhance the convenience of the user.

An example where plural pairs coinciding with the trigger device and the linked device are extruded from the operational status data will now be described.

FIG. 11 is a view showing one example of the operational status link information. As with FIG. 4, in the operational status link information shown in FIG. 11, information about the trigger device, information about the linked device, and the link interval are stored. FIG. 12 is a view showing one example of the intermediate data. As with FIG. 7, in the intermediate data shown in FIG. 12, the extraction condition of the extracted operational status data and the extracted data are stored. FIG. 13 is a view showing one example of the associated control information. As with FIG. 8, in the associated control information shown in FIG. 13, the condition data and the control data are stored.

By the same processing to extract the intermediate data of FIG. 7 from the operational status data of FIG. 5 according to the operational status link information of FIG. 4, a pair of the operational status data 515 and the operational status data 516 and a pair of the operational status data 517 and the operational status data 518 of FIG. 5 are extracted according to the operational status link information of FIG. 11. A pair of intermediate data 1201 and intermediate data 1202, and a pair of intermediate data 1203 and the intermediate data 1204 of FIG. 12 are generated. Herein, the intermediate data 1201 and 1203 extracted as the trigger device have different property values 1, indicating "low" and "high", respectively. Meanwhile, both the properties 1 in the intermediate data 1202 and 1204 extracted as the linked device indicate "heating power level", and the corresponding property values 1 exhibit "1" and "2", respectively. The associated control information setting portion 217 sets two pieces of associated control information as the associated control information corresponding to the pairs of extracted operational status data: associated control information having the property value 1 in the control data exhibiting "1" when the property value 1 in the condition data exhibits "low", and the associated control information having the property value 1 in the condition data exhibiting "2" when the property value 1 in the condition data exhibits "high".

This embodiment has described a case where pieces of the associated control information exhibiting different property values in the condition data and the control data are generated as an example where plural pieces of associated control information are generated from a single piece of operational status link information. However, plural pieces of associated control information having different device names, installed locations, and property information in the condition data and the control data or different control timing in the control data may be generated.

Also, a case where plural pieces of the associated control information are set when plural pairs of operational status data are extracted has been described. However, the associated control information setting portion 217 may set a single piece of associated control information common to plural pairs of extracted operational status data. For example, as the control timing in the control data in the associated control information, the associated control information setting portion 217 may set the average or the minimal value of the intervals of times at which the operational statuses of the paired operational status data have changed, or alternatively, it may set the control timing specified in correlation with the operational status link information.

Also, the associated control information setting portion 217 may set the condition data in a single piece of associated control information common to plural pairs of extracted operational status data to set the control data using the latest data among the operational status data, or alternatively it may set both the condition data and the control data from a pair of the latest operational status data. For example, in a case where the property value 1 in the operational status data 517 exhibits "low" and the property value 1 in the intermediate data extracted as the trigger device also exhibits "low", thereby coinciding with each other, the associated control information setting portion 217 generates a single piece of associated control information. In this case, the value of new operational status data may be set in the property value 1 in the control data, or the average value or the minimal value may be set therein.

The operational status data may have a flag to distinguish whether the change in the operational status occurred due to transmission of a control instruction from the home appliance control apparatus or under the control according to operations by the user, so that the operational status data according to the operations by the user alone is extracted as the linked device. In other words, in the processing in Step S6 in which the operational status data within the link interval in the operational status link information is successively read out from the oldest data by means of the operational status read portion 214, a change in the status according to the operation by the user alone may be set as the target to be read out.

Alternatively, the associated control information setting portion 217 may perform the processing periodically, so that the operational status data set as the target of the processing by this means before will not be set as the target to be read out by the operational status read portion 214, and instead newly accumulated operational status data alone will be set as the target to be read out. Also, the associated control information setting portion 217 may set new associated control information while referring to the associated control information that has been already generated, or it may rewrite the associated control information that has been already generated.

According to this configuration, by setting the associated control information with the use of the data extracted from the operational status data actually having a change in the operational status, it is possible to enable the associated control automatically with ease that otherwise requires operations by the user.

Second Embodiment

A second embodiment to designate the function of the device without designating the device type as the operational status link information will now be described.

FIG. 14 is a view showing one example of the device type information. The device type information shown in FIG. 14 comprises plural device types and functions furnished to the respective device types. In FIG. 14, the device type is brought into a correspondence with plural functions: function 1, function 2, and function 3. FIG. 15 is a view showing one example of the operational status link information in which the function is designated. In the trigger device information and the linked device information in the operational status link information shown in FIG. 15, the function furnished to the device is stored instead of the device type. FIG. 16 is a view showing one example of the associated control information in which the function is designated. In the condition data and the control data in the associated control information shown in FIG. 16, the function furnished to the device is stored instead of the device type.

Intermediate data of FIG. 17 is extracted from the operational status data of FIG. 5 according to the operational status link information of FIG. 15, and the flow of the processing to set the associated control information of FIG. 16 is the same as the processing flow of the associated control information setting portion 217 shown in FIG. 9 as in the first embodiment. In this processing flow, descriptions will be given to the processing to confirm whether the device name in the operational status data coincides with the function in the operational status link information in Step S5 in which whether the operational status data matches with trigger device information in the operational status link information is judged and in Step S8 in which whether the operational status data matches with the linked device information in the operational status link information is judged.

In Step S5 in which whether the operational status data matches with the trigger device information in the operational status information is confirmed, in a case where whether the operational status data 511 matches with the trigger device information in the operational status link information 1501 is judged, the associated control information setting portion 217 accesses the connected device information held in the device information management portion 216, and confirms that the device with the device name, "TV1", is of the device type, "TV". The associated control information setting portion 217 then accesses the device type information, and confirms that "TV" is the only function furnished to the device type, "TV". Herein, because the function, "cooking", designated in the trigger device information is absent in the operational status data 511, the associated control information setting portion 217 judges that the operational status data 511 does not match with the trigger device information in the operational status link information 1501. Likewise, in a case where whether the operational status data 512 matches with the trigger device information in the operational status link information 1501 is judged, the associated control information setting portion 217 accesses the connected device information held in the device information management portion 216, and confirms that the device with the device name, "IH cooking appliance 1", is of the device type, "IH cooking appliance". The associated control information setting portion 217 then accesses the device type information, and confirms that the device type, "IH cooking appliance", is furnished with the function, "cooking", and therefore judges that the "IH cooking appliance 1" is furnished with the function of "cooking". Further, because the operational status data 512 exhibits "installed location: kitchen", "property 1: operational status", and "property value 1: ON", the coincidence with the trigger device information in the operational status link information 1501 is judged. In this manner, the operational status data 512 is extracted as the trigger device. Also, in Step S8 in which whether the operational status data matches with the linked device information in the operational status link information is judged, the operational status data 514 is extracted as the linked device in the same manner, and intermediate data 1701 and 1702 shown in FIG. 17 are generated. Because processing other than this is the same as the processing in the first embodiment, descriptions thereof are omitted.

This embodiment showed a case to set the operational status link information in which the function information is designated as the trigger device or the linked device and the associated control information in which the function information is designated in the condition data and the control data. However, the function information may be designated in the operational status link information and the device type or the device name may be designated in the associated control information.

In a case where plural devices are furnished with the same function and plural pairs of the operational status data are extracted, plural pieces of associated control information may be set, in which the device type or the device name is designated. Alternatively, one piece of associated control information may be set using the latest data among the extracted operational status data. Further, one piece of associated control information may be set as the associated control information in which the function is designated, so that the average value is used for the control timing in the control data and a common item alone is set in the property and the property value in the condition data and in the property and the property value in the control data.

According to this configuration, data is extracted from the operational status data to set the associated control information to enable associated control by merely designating the function to be achieved without having to designate the type of the device in the operational status link information to be provided. It is thus possible to provide the operational status link information independent of the device connected to the home network, which in turn enables the associated control that corresponds to the life pattern of the user.

Third Embodiment

A third embodiment to designate the device that performs the condition judgment besides the trigger device will now be described.

FIG. 18 is a view showing one example of the operational status link information containing status confirming device information. The operational status link information shown in FIG. 18 contains status confirming device information besides the trigger device information, the linked device information, and the link interval information. The status confirming device information contains information about the device type and the installed location of a status confirming device, which is a device whose operational status is confirmed when the operational status of the trigger device has changed, and the property specifying the type of operational status to be confirmed and the property value indicating the value of the property. FIG. 19 is a view showing one example of intermediate data in which the extraction condition and the extracted data are stored. FIG. 20 is a view showing one example of the associated control information containing plural pieces of the condition data. The associated control information shown in FIG. 20 contains two pieces of condition data and one piece of control data.

Figure 21:
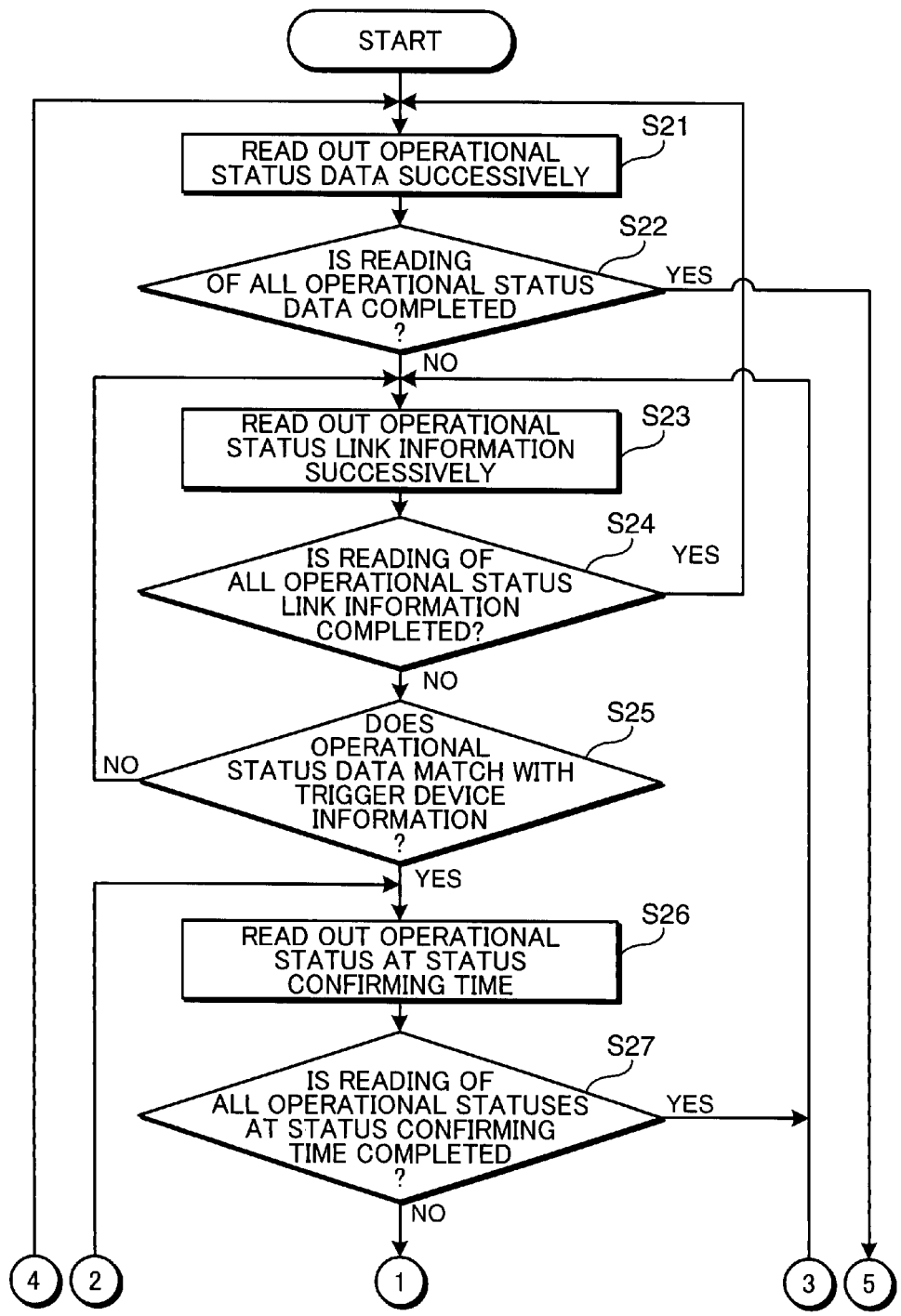
FIG. 21 is a first flowchart used to describe the processing by the associated control information setting portion in a third embodiment.
Figure 22:
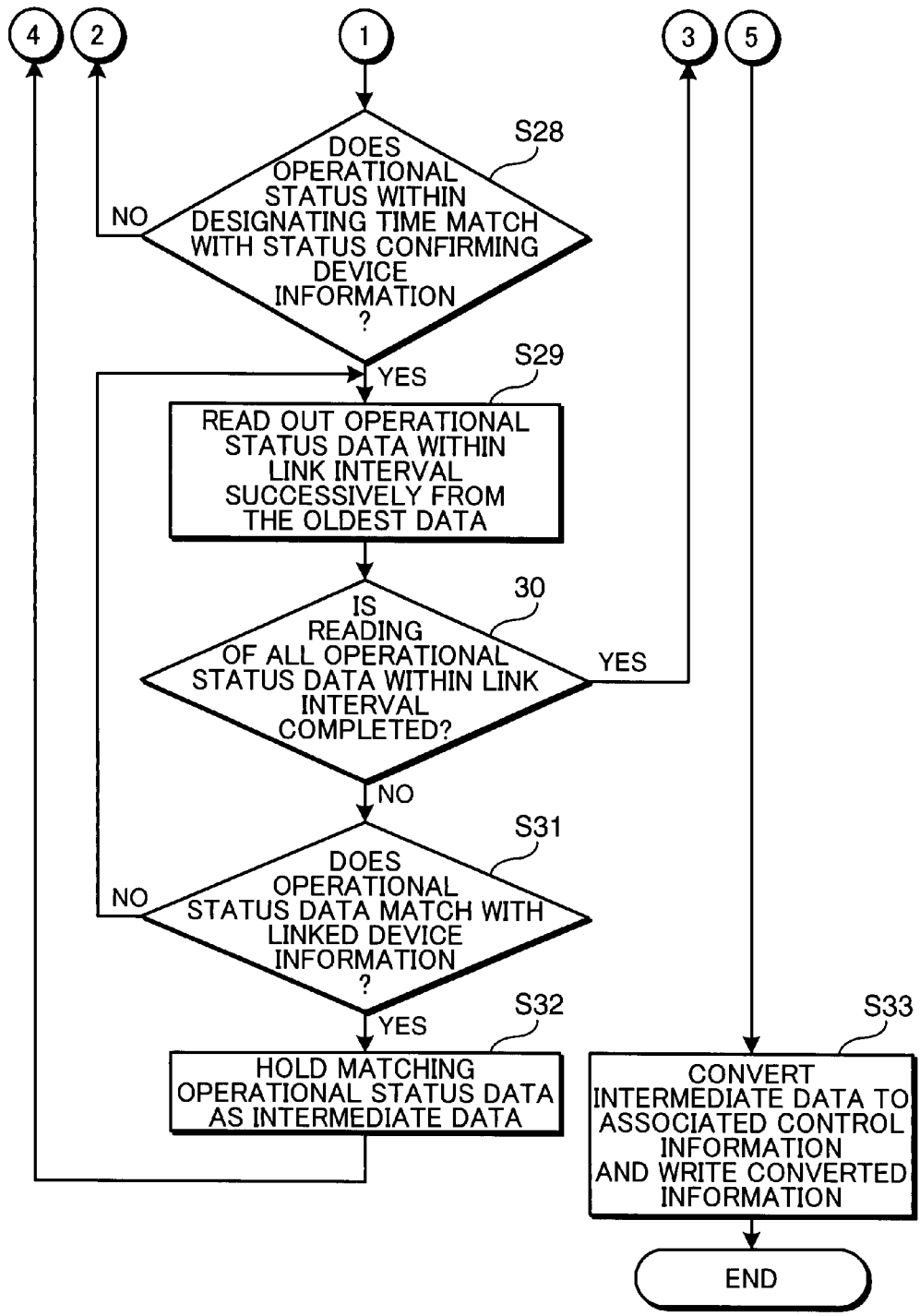
FIG. 22 is a second flowchart used to describe the processing by the associated control information setting portion in the third embodiment.

FIG. 21 and FIG. 22 are flowcharts used to describe the processing by the associated control information setting portion 217 in the third embodiment. Processing to set the associated control information of FIG. 20 by extracting intermediate data of FIG. 19 from the operational status data of FIG. 5 according to the operational status link information of FIG. 18 will be described using the flowcharts of FIG. 21 and FIG. 22. It should be noted that, in FIG. 21 and FIG. 22, because processing in Steps S21 through S25 is the same as the processing in Steps S1 through S5 of FIG. 9, and the processing in Steps S29 through S33 is the same as the processing in Steps S6 through S10 of FIG. 9, detailed descriptions of these steps are omitted.

The operational status data 527 and the operational status link information 1801 are extracted by the processing from Step S21 in which the operational status data is read out successively by means of the operational status read portion 214 to the processing in Step S25 in which whether the operational status data matches with the trigger device information in the operational status link information is judged.

Subsequently, in Step S26, the associated control information setting portion 217 acquires the property specifying the operational status at the status confirming time in the status confirming device information in the operational status link information by means of the operational status read potion 214. The device type of the status confirming device in the operational status link information 1801 is "human detection sensor", and the installed location is "entrance". The device satisfying this condition is found to be the device with the device name, "human detection sensor 1", from the connected device information acquired from the device information management portion 216. Also, because "0 to 30 seconds" is the status confirming time of the status confirming device in the operational status link information 1801, the associated control information setting portion 217 acquires the time at which the operational status of the trigger device has changed from the operational status data 527. The associated control information setting portion 217 acquires operational status data 526 and 531 of "human detection sensor 1" from the operational status data in order to acquire the information specifying the operational status of "human detection sensor 1" within the operational status designating time, from "10/2 9:26:13" to "10/2 9:26:43". It is understood that the detection status of "human detection sensor 1" within the designating time is "OFF" from this information.

Subsequently, in Step S27, the associated control information setting portion 217 judges whether reading of all the operational statuses within the status confirming time is completed. The associated control information setting portion 217 judges that reading of all the operational statuses within the status confirming time is completed when there is no more operational status to be read out. Upon judging that reading of all the operational statuses within the status confirming time is not completed (NO in Step S27), the associated control information setting portion 217 proceeds to the processing in Step S28, and upon judging that reading of all the operational statuses within the status confirming time is completed (YES in Step S27), it returns to the processing in Step S23.

Subsequently, in Step S28, the associated control information setting portion 217 judges whether the operational status within the operational status designating time matches with the status confirming device information. Upon judging that the operational status within the operational status designating time does not match with the status confirming device information (NO in Step S28), the associated control information setting portion 217 returns to the processing in Step S26 to acquire the property specifying another operational status within the status confirming time in the status confirming device information in the operational status link information. Meanwhile, upon judging that the operational status within the operational status designating time matches with the status confirming device information (YES in Step S28), the associated control information setting portion 217 proceeds to the processing in Step S29.

The operational status data 523 is then extracted as the processing in Steps S29 through S31 is performed. Subsequently, in Step S32, the associated control information setting portion 217 holds the matching operational status data as the intermediate data. Herein, the associated control information setting portion 217 holds the operational status data 527 as intermediate data 1901, the operational status data 526 as intermediate data (status confirming device) 1902, and the operational status data 523 as intermediate data 1903. In this instance, the intermediate data 1902 sets the status confirming time designated in the operational status link information as the status confirming time.

Intermediate data shown in FIG. 19 is generated as the processing in Step S21 through Step S32 as above is performed until there is no more operational status data to be read out in Step S21. Finally, in Step S33, the associated control information setting portion 217 converts the intermediate data to the associated control information and writes the converted associated control information in the associated control information accumulation portion 218. The associated control information of FIG. 20 is generated by registering the data 1902 of the status confirming device in the intermediate data as the second condition data, and by setting "30 seconds" as a continuing time over which the state is continuously confirmed.

The associated control information setting portion 217 sets "30 seconds" as each of the status confirming time in the intermediate data 1902 and the continuing time in the second condition data in the associated control information. However, a time over which the status has been maintained since the time at which the status of the trigger device had changed according to the operational status data may be set instead.

Also, this embodiment showed an example in a case where the operational status link information contains one trigger device, one status confirming device, and one linked device. However, one or more than one trigger device may be provided, 0 or one or more than one status confirming device may be provided, and one or more than one linked device may be provided. In addition, for one piece of the associated control information to be set, one or more than one piece of data may be set as the condition data and the control data according to the operational status link information.

According to this configuration, the associated control information can be generated by extracting data from the operational status data. It is thus possible to enable associated control of plural devices in such a manner so as to suit the life pattern of the user without the need of complicated settings by the user.

The operational status link information further contains status confirming device information to specify the status confirming device whose operational status is confirmed when the operational status of a single home appliance has changed. Also, the linked device information is the information to specify another home appliance that activates in association with the operational status of the single home appliance and the operational status of the status confirming device. The operational status data corresponding to the operational status in the trigger device information contained in the operational status link information is extracted, the operational status data corresponding to the status confirming device information contained in the operational status link information is extracted, and the operational status data corresponding to the linked device information contained in the operational status link information is extracted, all from the accumulated operational status data. Subsequently, the associated control information is generated according to the extracted operational status data, which contains the operational status of the single home appliance and the operational status of the status confirming device and is used as the condition to start the associated control of the single electronic device and the another electronic device and the content of the control on another home appliance.

Hence, because another home appliance is controlled in association with the operational statuses of a single home appliance and the status confirming device whose operational status is confirmed when the operational status of the single home appliance has changed, further complicated associated control is enabled.

Further, the status confirming device information contains the device type or the function of the status confirming device. The device type corresponding to the device name contained in the operational status data is specified as a reference is made to the device information management portion 216. The operational status data corresponding to the operational status in the trigger device information contained in the operational status link information is extracted, the operational status data corresponding to the status confirming device information contained in the operational status link information is extracted, and the operational status data corresponding to the linked device information contained in the operational status link information is extracted, all from the accumulated operational status data.

Because the device name of the home appliance and the device type of the home appliance are stored with a correspondence established therebetween, there is no need to re-write the linked device information each time a new home appliance is connected, which can save the labor of the user.

In the first through third embodiments, the link information management portion 215 stores, as the operational status link information, the device type, the property, the property value, and the installed location of the trigger device, and the device type and the installed location of the linked device as well as the link interval. The invention, however, is not particularly limited to this configuration, and a covered period over which the associated control is enabled may be stored additionally. FIG. 23 is a view showing one example of the operational status link information containing the covered period.

As is shown in FIG. 23, the operational status link information comprises information about the trigger device, information about the linked device, link interval information, and covered period information. The covered period information means information to specify a period over which the associated control is enabled. Referring to FIG. 23, regarding the trigger device, the device type is "air conditioner", the property is "operational status", the property value is "ON", and the installed location is "living room". Regarding the linked device, the device type is "electric fan" and the installed location is "living room". The link interval is "from 5 minutes before to 10 minutes later", and the covered period is "from December to February".

In this case, in Step S5 of FIG. 9, upon judging that the operational status data matches with the trigger device, the associated control information setting portion 217 judges whether the date in the operational status data falls within the covered period in the operational status link information. When the date in the operational status data falls outside the covered period in the operational status link information, the associated control information setting portion 217 returns to the processing in Step S3. On the other hand, upon judging that the date in the operational status data falls within the covered period in the operational status link information, it proceeds to the processing in Step S6.

The covered period information may be contained in the condition data in the associated control information, so that whether the operational status data falls within the covered period is judged when a judgment is made as to the coincidence of the operational status data with the condition data in the associated control information.

Further, even in a case where the covered period information is not provided to the operational status link information, the condition data and the control data may be generated for each covered period by providing information about the covered period to the condition data in the associated control information. FIG. 24 is a view showing one example of the associated control information containing the covered period. As is shown in FIG. 24, the associated control information comprises the condition data and the control data. The condition data contains the management number, the covered period, the device name, the installed location, the property information (property 1, property value 1, property 2, and property value 2), and the continuing time. The control data contains the management number, the control timing, the device name, the installed location, and the property information (property 1, property value 1, property 2, and property value 2).

For example, when the operational status of the IH cooking appliance 1 installed in the kitchen and set with the covered period of March to May is switched ON, the operational status of the ventilating fan 1 installed in the kitchen automatically comes ON 21 seconds later. In this instance, a quantity of airflow of the ventilating fan 1 is set to Level 3. Likewise, when the operational status of the IH cooking appliance 1 installed in the kitchen and set with the covered period of June to August is switched ON, the operational status of the ventilating fan 1 installed in the kitchen automatically comes ON simultaneously. In this instance, a quantity of airflow is set to Level 4. In this manner, the condition data is generated for each covered period, and the control data corresponding to each condition data is generated. It is thus possible to enable associated control within a specific time range for each season or during a day, which in turn makes it possible to control the home appliances delicately.

In addition, the device may identify the operator, so that information to identify the operator is further contained in the operational status data to contain the information to identify the operator in the condition data in the associated control information. FIG. 25 is a view showing one example of the operational status data containing the information to identify the operator.

In this case, each home appliance is provided with an operator identification portion to identify the operator through fingerprint authentication or the like. As is shown in FIG. 25, the operational status data comprises the date, the operator, the device name, the installed location, and the property information (property 1, property value 1, property 2, and property value 2). The operator identification portion identifies the operator by reading the fingerprint of the operator, and checking the read fingerprint against the pre-registered fingerprint. The home appliance transmits the name of the identified operator contained in the operational status data to the home appliance control apparatus. For example, in the operational status data shown in FIG. 25, the date is "10/2 8:37:07", the operator is "TOSHIKO", the device name is "IH cooking appliance 1", the installed location is "kitchen", the property 1 is "operational status", the property value 1 is "ON", the property 2 is "heating power", and the property value 2 is "high".

The associated control information setting portion 217 may set the information about the operator in the condition data in the associated control information to generate the condition data and the control data for each operator. FIG. 26 is a view showing one example of the associated control information containing the information to identify the operator. As is shown in FIG. 26, the associated control information comprises the condition data and the control data. The condition data contains the management number, the operator, the device name, the installed location, the property information (property 1, property value 1, property 2, and property value 2), and the continuing time. The control data contains the management number, the control timing, the device name, the installed location, and the property information (property 1, property value 1, property 2, and property value 2).

For example, when the operational status of the IH cooking appliance 1 installed in the kitchen is switched ON as the result of an operation made by an operator, "TOSHIKO", the operational status of the ventilating fan 1 installed in the kitchen automatically comes ON 32 seconds later. In this instance, a quantity of airflow of the ventilating fan 1 is set to Level 2. Likewise, when the operational status of the IH cooking appliance 1 installed in the kitchen is switched ON as the result of an operation made by an operator, "AKIO", the operational status of the ventilating fan 1 installed in the kitchen automatically comes ON 5 seconds later. In this instance, a quantity of airflow of the ventilating fan 1 is set to Level 4. In this manner, the condition data is generated for each operator, and the control data corresponding to each condition data is generated. Operator-dependent associated control is thus enabled, which in turn makes it possible to control the home appliances delicately.

Further, the associated control information may be displayed to accept a change made by the user in the associated control information. FIG. 27 is a view showing another configuration of the home appliance control apparatus according to one embodiment of the invention. In FIG. 27, like components are labeled with like reference numerals with respect to FIG. 2, and descriptions of these components are omitted.

In addition to the configuration of FIG. 2, the home appliance control apparatus 121 further includes an associated control information display portion 219 and an associated control information change portion 220. The associated control information display portion 219 displays thereon the associated control information accumulated in the associated control information accumulation portion 218. The associated control information change portion 220 accepts a change made by the user in the associated control information, and changes the associated control information accumulated in the associated control information accumulation portion 218. In this embodiment, the associated control information display portion 219 corresponds to one example of the display means, and the associated control information change portion 220 corresponds to one example of the change means.

FIG. 28 is a view showing one example of an associated control information display screen. An associated control information display screen 271 shown in FIG. 28 is displayed on the associated control information display portion 219. Condition data 271a and control data 271b are displayed on the associated control information display screen 271. The associated control information in this embodiment is displayed for each management number. The user is able to confirm the associated control information being displayed to change the control timing or the like through the change accept portion. The user is also able to delete the associated control information for each management number.

As has been described, because the accumulated associated control information is displayed, the user is able to confirm the content of settings of the associated control. Also, because a change made by the user in the associated control information being displayed is accepted and the accumulated associated control information is changed, the user is able to change the content of the settings of the associated control that has been generated automatically. It is thus possible to achieve desired associated control of the home appliances.

The concrete embodiments described above chiefly include inventions having the configurations as follows.

An electronic device control apparatus according to one aspect of the invention is an electronic device control apparatus that controls an electronic device, including: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

A method for controlling an electronic device according to another aspect of the invention is a method for controlling an electronic device, including: a reception step of receiving operational status data containing an operational status of each electronic device; an operational status data accumulation step of accumulating the operational status data received in the reception step; a link information management step of managing operational status link information containing trigger device information to specify an operational status of a single electronic device among plural electronic devices, and linked device information to specify another electronic device that activates in association with the operational status of the single electronic device; an operational status data extraction step of extracting operational status data corresponding to an operational status in the trigger device information contained in the operational status link information and extracting operational status data corresponding to the linked device information contained in the operational status link information, both from the operational status data accumulated in the operational status data accumulation step; an associated control information generation step of generating, according to the operational status data extracted in the operational status data extraction step, associated control information containing the operational status of the single electronic device and used as a condition to start associated control of the single electronic device and the another electronic device and a content of control on the another electronic device; an associated control information accumulation step of accumulating the associated control information generated in the associated control information generation step; and an associated control step of enabling associated control of the electronic devices according to the associated control information accumulated in the associated control information accumulation step.

An electronic device control program according to still another aspect of the invention is an electronic device control program to control an electronic device, which causes a computer to function as follows: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

A computer-readable recording medium having recorded an electronic device control program according to still another aspect of the invention is a computer-readable recording medium having recorded an electronic device control program to control an electronic device, wherein the computer-readable recording medium has recorded an electronic device control program that causes a computer to function as follows: reception means for receiving operational status data containing an operational status of each electronic device; operational status data accumulation means for accumulating the operational status data received at the reception means; link information management means for managing operational status link information containing trigger device information to specify an operational status of a single electronic device among plural electronic devices, and linked device information to specify another electronic device that activates in association with the operational status of the single electronic device; operational status data extraction means for extracting operational status data corresponding to an operational status in the trigger device information contained in the operational status link information and extracting operational status data corresponding to the linked device information contained in the operational status link information, both from the operational status data accumulated in the operational status data accumulation means; associated control information generation means for generating, according to the operational status data extracted by the operational status data extraction means, associated control information containing the operational status of the single electronic device and used as a condition to start associated control of the single electronic device and the another electronic device and a content of control on the another electronic device; associated control information accumulation means for accumulating the associated control information generated by the associated control information generation means; and associated control means for enabling associated control of the electronic devices according to the associated control information accumulated in the associated control information accumulation means.

According to these configurations, the operational status data containing the operational status of each electronic device is received, and the received operational status data is accumulated. Also, the operational status link information is managed, which contains trigger device information to specify the operational status of a single electronic device among plural electronic devices and linked device information to specify another electronic device that activates in association with the operational status of the single electronic device. The operational status data corresponding to the operational status in the trigger device information contained in the operational status link information is extracted, and the operational status data corresponding to the linked device information contained in the operational status link information is extracted, both from the accumulated operational status data. Subsequently, the associated control information is generated according to the extracted operational status data, which contains the operational status of the single electronic device and is used as the condition to start the associated control of the single electronic device and the another electronic device and the content of the control on the another electronic device, and the associated control information thus generated is accumulated. Thereafter, associated control of the electronic devices is enabled according to the accumulated associated control information.

Hence, by generating information about the condition and the control to enable the associated control according to the operational statuses of the home appliances used actually in the house, it is possible to enable the associated control that suits the life pattern of the user and the characteristics of the connected electronic devices, which makes it possible to make the settings precisely so as not to cause inconsistency in the condition and the operations of the associated control. In addition, because information about the condition and the control to enable the associated control is automatically generated by using the operational status link information to extract the information for the associated control, the user or the system constructor is able to make the settings of the associated control with ease without having to perform operations.

Also, in the electronic device control apparatus described above, it is preferable that: the operational status data further contains a time at which the operational status of each electronic device has changed; the operational status link information further contains a maximum detection time to judge a correlation with the single electronic device; and the operational status data extraction means extracts operational status data corresponding to an operational status in the trigger device information contained in the operational status link information, and extracts operational status data corresponding to the linked device information contained in the operational status link information within the maximum detection time contained in the operational status link information, both from the operational status data accumulated in the operational status data accumulation means.

According to this configuration, the operational status data further contains the time at which the operational status of each electronic device has changed, and the operational status link information further contains the maximum detection time to judge a correlation with the single electronic device. Further, the operational status data corresponding to the operational status in the trigger device information contained in the operational status link information is extracted, and the operational status data corresponding to the linked device information contained in the operational status link information is extracted within the maximum detection time contained in the operational status link information, both from the accumulated operational status data.

Hence, because the operational status data corresponding to the linked device information is extracted within the maximum detection time to judge a correlation with the single electronic device, it is possible to extract exactly the operational status data of another electric device that activates in association with the operational status of the single electronic device.

Also, in the electronic device control apparatus described above, it is preferable that: the operational status data further contains a device name unique to each electronic device; the trigger device information contains a device type or a function of the single electronic device; the linked device information contains a device type or a function of the another electronic device; the electronic device control apparatus further comprises device information storage means for storing the device name of each electronic device and the device type of each electronic device with a correspondence established therebetween; and the operational status data extraction means, by referring to the device information storage means, specifies the device type corresponding to the device name contained in the operational status data, and extracts operational status data corresponding to an operational status in the trigger device information contained in the operational status link information, and extracts operational status data corresponding to the linked device information contained in the operational status link information, both from the operational status data accumulated in the operational status data accumulation means.

According to this configuration, the operational status data further contains the device name unique to each electronic device. The trigger device information contains the device type or the function of the single electronic device, and the linked device information contains the device type or the function of the another electronic device. Also, the device name of each electronic device and the device type of each electronic device are stored in the device information storage means with a correspondence established therebetween. The device type corresponding to the device name contained in the operational status data is specified as a reference is made to the device information storage means. The operational status data corresponding to the operational status in the trigger device information contained in the operational status link information is extracted and the operational status data corresponding to the linked device information contained in the operational status link information is extracted, both from the accumulated operational status data.

Hence, because the device name of the electronic device and the device type of the electronic device are stored with a correspondence established therebetween, there is no need to re-write the linked device information each time a new electronic device is connected, which can save the labor of the user.

Also, in the electronic device control apparatus described above, it is preferable that the operational status link information contains status confirming device information to specify a status confirming device whose operational status is confirmed when an operational status of the single electronic device has changed; the linked device information is information to specify another device that activates in association with the operational status of the single electronic device and the operational status of the status confirming device; the operational status data extraction means extracts operational status data corresponding to an operational status in the trigger device information contained in the operational status link information, extracts operational status data corresponding to the status confirming device information contained in the operational status link information, and extracts operational status data corresponding to the linked device information contained in the operational status link information, all from the operational status data accumulated in the operational status data accumulation means; and the associated control information generation means generates, according to the operational status data extracted by the operational status data extraction means, the associated control information containing the operational status of the signal electronic device and the operational status of the status confirming device and used as a condition to start the associated control of the single electronic device and the another electronic device and a content of control on the another electronic device.

According to this configuration, the operational status link information further contains the status confirming device information to specify the status confirming device whose operational status is confirmed when the operational status of the single electronic device has changed. Further, the linked device information is the information to specify another electronic device that activates in association with the operational status of the single electronic device and the operational status of the status confirming device. The operational status data corresponding to the operational status in the trigger device information contained in the operational status link information is extracted, the operational status data corresponding to the status confirming device information contained in the operational status link information is extracted, and the operational status data corresponding to the linked device information contained in the operational status link information is extracted, all from the accumulated operational status data. Subsequently, the associated control information is generated according to the extracted operational status data, which contains the operational status of the single electronic device and the operational status of the status confirming device and is used as the condition to start the associated control of the single electronic device and the another electronic device and the content of the control on the another electronic device.

Hence, because the another electronic device is controlled in association with the operational statuses of the signal electronic device and the status confirming device whose operational status is confirmed when the operational status of the single electronic device has changed, further complicated associated control is enabled.

Also, in the electronic device control apparatus described above, it is preferable that the status confirming device information contains a device type or a function of the status confirming device, and that the operational status data extraction means, by referring to the device information storage means, specifies the device type corresponding to the device name contained in the operational status data, and extracts operational status data corresponding to an operational status in the trigger device information contained in the operational status link information, extracts operational status data corresponding to the status confirming device information contained in the operational status link information, and extracts operational status data corresponding to the linked device information contained in the operational status link information, all from the operational status data accumulated in the operational status data accumulation means.

According to this configuration, the status confirming device information contains the device type or the function of the status confirming device. The device type corresponding to the device name contained in the operational status data is specified as a reference is made to the device information storage means. The operational status data corresponding to the operational status in the trigger device information contained in the operational status link information is extracted, the operational status data corresponding to the status confirming device information contained in the operational status link information is extracted, and the operational status data corresponding to the linked device information contained in the operational status link information is extracted, all from the accumulated operational status data.

Hence, because the device name of the electronic device and the device type of the electronic device are stored with a correspondence established therebetween, there is no need to re-write the linked device information each time a new electronic device is connected, which can save the labor of the user.

Also, in the electronic device control apparatus described above, it is preferable that the link information management means acquires the operational status link information from a server connected to the electronic device control apparatus via a network. According to this configuration, because the operational status link information is acquired from the server connected to the electronic device control apparatus via the network, the user can save the trouble of updating the operational status link information. It is thus possible to hold the latest operational status link information always.

Also, in the electronic device control apparatus described above, it is preferable that the operational status link information further contains plural pieces of period information to specify a period over which associated control is enabled, and that the associated control information generation means generates the associated control information for each piece of period information contained in the operational status link information. According to this configuration, the operational status link information further contains plural pieces of period information to specify a period over which associated control is enabled, and the associated control information is generated for each piece of period information contained in the operational status link information. It is thus possible to enable associated control within a specific time range for each season or during a day, which in turn makes it possible to control the home appliances delicately.

Also, in the electronic device control apparatus described above, it is preferable that: the operational status data further contains operator information to identify an operator of each electronic device; the operational status data extraction means extracts operational status data corresponding to an operational status in the trigger device information contained in the operational status link information, and extracts operational status data corresponding to the linked device information contained in the operational status link information, both from the operational status data for a same operator accumulated in the operational status data accumulation means; and the associated control information generation means generates the associated control information for each operator.

According to this configuration, the operational status data further contains the operator information to identify the operator of each electronic device. The associated control information is generated for each operator by extracting the operational status data corresponding to the operational status in the trigger device information contained in the operational status link information, and extracting the operational status data corresponding to the linked device information contained in the operational status link information, both from the accumulated operational status data for the same operator. Because the associated control information for each operator is generated, it is possible to enable operator-dependent associated control, which makes it possible to control the electronic devices delicately.

Also, in the electronic device control apparatus described above, it is preferable to further include display means for displaying the associated control information accumulated in the associated control information accumulation means. According to this configuration, because the accumulated associated control information is displayed, the user is able to confirm the content of the settings of associated control.

Also, in the electronic device control apparatus described above, it is preferable to further include change means for accepting a change made by a user in the associated control information being displayed by the display means and changing the associated control information accumulated in the associated control information accumulation means. According to this configuration, because a change made by the user in the associated control information being displayed is accepted, and the accumulated associated control information is changed, the user is able to change the content of the setting of the associated control that has been generated automatically. It is thus possible to achieve desired associated control of the electronic devices.

INDUSTRIAL APPLICABILITY

The electronic device control apparatus, the method for controlling an electronic device, the electronic device control program, and the computer-readable recording medium having recorded an electronic device control program of the invention are useful for the home network system in one-unit homes and complex housings. They are also applicable to offices, business institutions, complex buildings, and so forth.

The invention claimed is:

1. An electronic device control apparatus for controlling plural electronic devices, said electronic control apparatus comprising:
   a reception portion for receiving operational status data containing an operational status of each electronic device and a time at which the operational status of each electronic device has changed;
   an operational status data accumulation portion for accumulating the operational status data received at the reception portion;
   a link information management portion for managing operational status link information containing:
      trigger device information to specify an operational status of a single electronic device among the plural electronic devices;

linked device information to specify another electronic device that activates in association with the operational status of the single electronic device; and a maximum detection time corresponding to a predetermined time interval for extracting the operational status of the another electronic device in correlation with the operational status of the single electronic device;

an operational status data extraction portion for extracting, from the operational status data accumulated in the operational status data accumulation portion, operational status data of the single electronic device corresponding to an operational status in the trigger device information contained in the operational status link information, and extracting, within the maximum detection time, from the operational status data accumulated in the operational status data accumulation portion, operational status data of the another electronic device corresponding to the linked device information contained in the operational status link information;

an associated control information generation portion for generating, according to the operational status data extracted by the operational status data extraction portion: associated control information containing the operational status of the single electronic device, and which is used as a condition to start associated control of the single electronic device and the another electronic device; and a content of control on the another electronic device;

an associated control information accumulation portion for accumulating the associated control information generated by the associated control information generation portion; and an associated control portion for enabling associated control of the single electronic device and the another electronic device according to the associated control information accumulated in the associated control information accumulation portion.

2. The electronic device control apparatus according to claim 1, wherein:

the operational status data further contains a device name unique to each electronic device;

the trigger device information contains a device type or a function of the single electronic device;

the linked device information contains a device type or a function of the another electronic device;

the electronic device control apparatus further comprises a device information storage portion for storing the device name of each electronic device and the device type of each electronic device with a correspondence established therebetween; and the operational status data extraction portion, with reference to the device information storage portion, specifies the device type corresponding to the device name contained in the operational status data, and extracts operational status data corresponding to an operational status in the trigger device information contained in the operational status link information from the operational status data accumulated in the operational status data accumulation portion, and extracts operational status data corresponding to the linked device information contained in the operational status link information from the operational status data accumulated in the operational status data accumulation portion.

3. The electronic device control apparatus according to claim 1, wherein:

the link information management portion acquires the operational status link information from a server connected to the electronic device control apparatus via a network.

4. The electronic device control apparatus according to claim 1, wherein:

the operational status link information further contains plural pieces of period information to specify a period over which associated control is enabled; and the associated control information generation portion generates the associated control information for each piece of period information contained in the operational status link information.

5. The electronic device control apparatus according to claim 1, wherein:

the operational status data further contains operator information to identify an operator of each electronic device;

the operational status data extraction portion extracts the operational status data corresponding to an operational status in the trigger device information, the operational status data corresponding to the status confirming device information, and the operational status data corresponding to the linked device information for a same operator accumulated in the operational status data accumulation portion; and the associated control information generation portion generates the associated control information for each operator.

6. The electronic device control apparatus according to claim 1, further comprising:

a display portion for displaying the associated control information accumulated in the associated control information accumulation portion.

7. The electronic device control apparatus according to claim 6, further comprising:

a change portion for accepting a change made by a user in the associated control information being displayed by the display portion and changing the associated control information accumulated in the associated control information accumulation portion.

8. An electronic device control apparatus for controlling plural electronic devices, said electronic control apparatus comprising:

a reception portion for receiving operational status data containing an operational status of each electronic device and a time at which the operational status of each electronic device has changed;

an operational status data accumulation portion for accumulating the operational status data received at the reception portion;

a link information management portion for managing operational status link information containing:

trigger device information to specify an operational status of a single electronic device among the plural electronic devices and status confirming device information to specify a status confirming device whose operational status is confirmed when an operational status of the single electronic device has changed;

linked device information to specify another device that activates in association with the operational status of the single electronic device and the operational status of the status confirming device; and a maximum detection time corresponding to a predetermined time interval for extracting the operational status of the another electronic device in correlation with the operational status of the single electronic device;

an operational status data extraction portion for extracting, from the operational status data accumulated in the operational status data accumulation portion, operational status data corresponding to an operational status in the trigger device information contained in the operational status link information, extracting, from the operational status data accumulated in the operational status data accumulation portion, operational status data corresponding to the status confirming device information contained in the operational status link information, and for extracting, within the maximum detection time, from the operational status data accumulated in the operational status data accumulation portion, operational status data corresponding to the linked device information contained in the operational status link information;

an associated control information generation portion for generating, according to the operational status data extracted by the operational status data extraction portion: associated control information containing the operational status of the signal electronic device and the operational status of the status confirming device, which is used as a condition to start the associated control of the single electronic device and the another electronic device; and a content of control on the another electronic device;

an associated control information accumulation portion for accumulating the associated control information generated by the associated control information generation portion; and an associated control portion for enabling associated control of the single electronic device and the another electronic device according to the associated control information accumulated in the associated control information accumulation portion.

9. The electronic device control apparatus according to claim 8, wherein:

the status confirming device information contains a device type or a function of the status confirming device; and the operational status data extraction portion, with reference to the device information storage portion, specifies the device type corresponding to the device name contained in the operational status data, extracts operational status data corresponding to an operational status in the trigger device information contained in the operational status link information from the operational status data accumulated in the operational status data accumulation portion, extracts operational status data corresponding to the status confirming device information contained in the operational status link information from the operational status data accumulated in the operational status data accumulation portion, and extracts operational status data corresponding to the linked device information contained in the operational status link information from the operational status data accumulated in the operational status data accumulation portion.

10. The electronic device control apparatus according to claim 8, wherein:

the link information management portion acquires the operational status link information from a server connected to the electronic device control apparatus via a network.

11. The electronic device control apparatus according to claim 8, wherein:

the operational status link information further contains plural pieces of period information to specify a period over which associated control is enabled; and the associated control information generation portion generates the associated control information for each piece of period information contained in the operational status link information.

12. The electronic device control apparatus according to claim 8, wherein:

the operational status data further contains operator information to identify an operator of each electronic device;

the operational status data extraction portion extracts operational status data corresponding to an operational status in the trigger device information contained in the operational status link information, and extracts operational status data corresponding to the linked device information contained in the operational status link information, both from the operational status data for a same operator accumulated in the operational status data accumulation portion; and the associated control information generation portion generates the associated control information for each operator.

13. The electronic device control apparatus according to claim 8, further comprising:

a display portion for displaying the associated control information accumulated in the associated control information accumulation portion.

14. The electronic device control apparatus according to claim 13, further comprising:

a change portion for accepting a change made by a user in the associated control information being displayed by the display portion and changing the associated control information accumulated in the associated control information accumulation portion.

15. A method for controlling plural electronic devices, said method comprising:

a reception step of receiving operational status data containing an operational status of each electronic device and a time at which the operational status of each electronic device has changed;

an operational status data accumulation step of accumulating the operational status data received in the reception step;

a link information management step of managing operational status link information containing:

trigger device information to specify an operational status of a single electronic device among the plural electronic devices;

linked device information to specify another electronic device that activates in association with the operational status of the single electronic device; and a maximum detection time corresponding to a predetermined time interval for extracting the operational status of the another electronic device in correlation with the operational status of the single electronic device;

an operational status data extraction step of extracting, within the maximum detection time, from the operational status data accumulated in the operational status data accumulation step, operational status data of the single electronic device corresponding to an operational status in the trigger device information contained in the operational status link information, and extracting, within the maximum detection time, from the operational status data accumulated in the operational status data accumulation step, operational status data of the another electronic device corresponding to the linked device information contained in the operational status link information;

an associated control information generation step of generating, according to the operational status data extracted in the operational status data extraction step: associated control information containing the operational status of the single electronic device, and which is used as a condition to start associated control of the single electronic device and the another electronic device; and a content of control on the another electronic device;

an associated control information accumulation step of accumulating the associated control information generated in the associated control information generation step; and an associated control step of enabling associated control of the single electronic device and the another electronic device according to the associated control information accumulated in the associated control information accumulation step.

16. A non-volatile computer-readable recording medium having recorded thereon an electronic device control program for controlling plural electronic devices and for causing a computer to perform at least the following:

a reception step of receiving operational status data containing an operational status of each electronic device and a time at which the operational status of each electronic device has changed;

an operational status data accumulation step of accumulating the operational status data received in the reception step;

a link information management step of managing operational status link information containing:

trigger device information to specify an operational status of a single electronic device among the plural electronic devices;

linked device information to specify another electronic device that activates in association with the operational status of the single electronic device; and a maximum detection time corresponding to a predetermined time interval for extracting the operational status of the another electronic device in correlation with the operational status of the single electronic device;

an operational status data extraction step of extracting, from the operational status data accumulated in the operational status data accumulation step, operational status data of the single electronic device corresponding to an operational status in the trigger device information contained in the operational status link information, and extracting, within the maximum detection time, from the operational status data accumulated in the operational status data accumulation step, operational status data of the another electronic device corresponding to the linked device information contained in the operational status link information;

an associated control information generation step of generating, according to the operational status data extracted in the operational status data extraction step: associated control information containing the operational status of the single electronic device, and which is used as a condition to start associated control of the single electronic device and the another electronic device; and a content of control on the another electronic device;

an associated control information accumulation step of accumulating the associated control information generated in the associated control information generation step; and an associated control step of enabling associated control of the single electronic device and the another electronic device according to the associated control information accumulated in the associated control information accumulation step.

* * * * *